Figure 33:
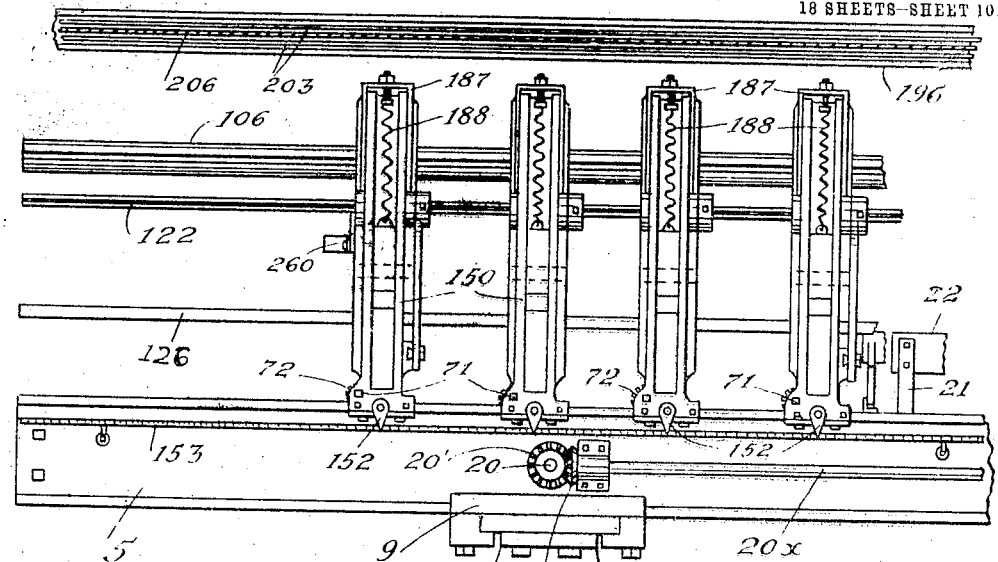

J. E. ERICKSON.
MACHINE FOR CUTTING AND CREASING BLANKS.
APPLICATION FILED JAN. 10, 1911.
1,058,165.
Patented Apr. 8, 1913.
18 SHEETS—SHEET 1.
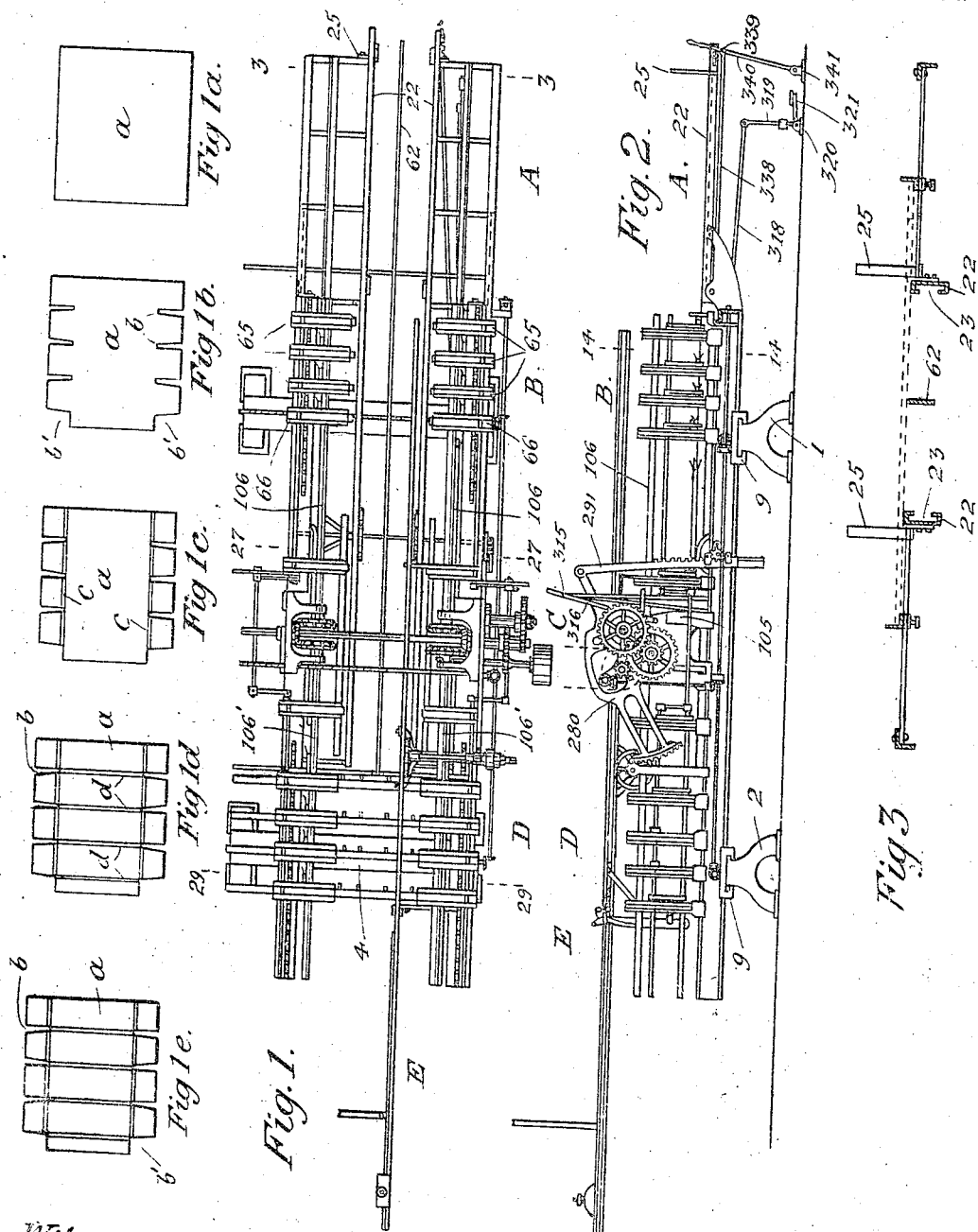
Witnesses:
Theo. Legaard.
C. S. Orvold.
Inventor:
John E. Erickson.
By F. A. Whiteley
his Attorney.

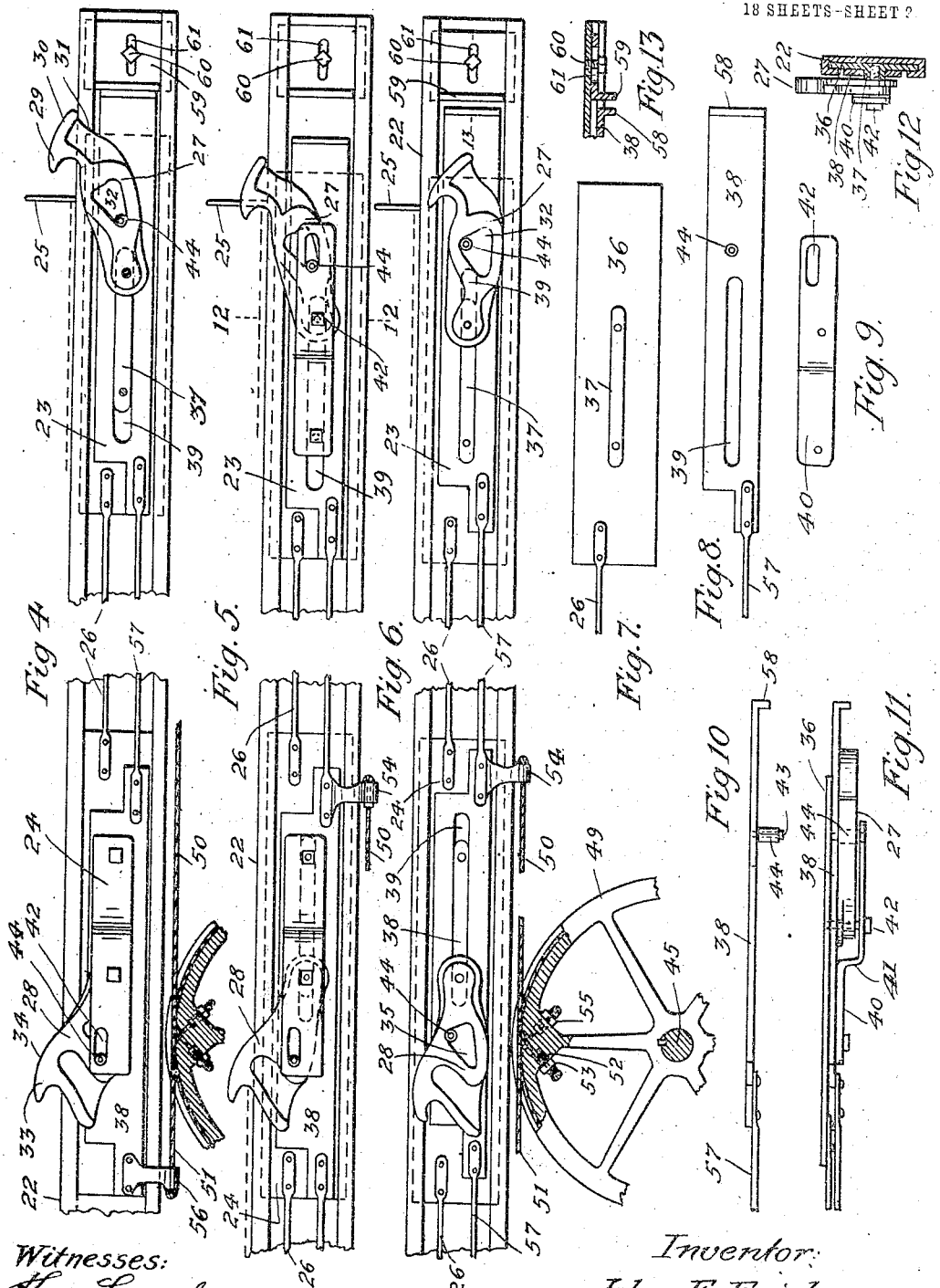
J. E. ERICKSON.
MACHINE FOR CUTTING AND CREASING BLANKS.
APPLICATION FILED JAN. 10, 1911.
1,058,165.
Patented Apr. 8, 1913.
18 SHEETS—SHEET 2.

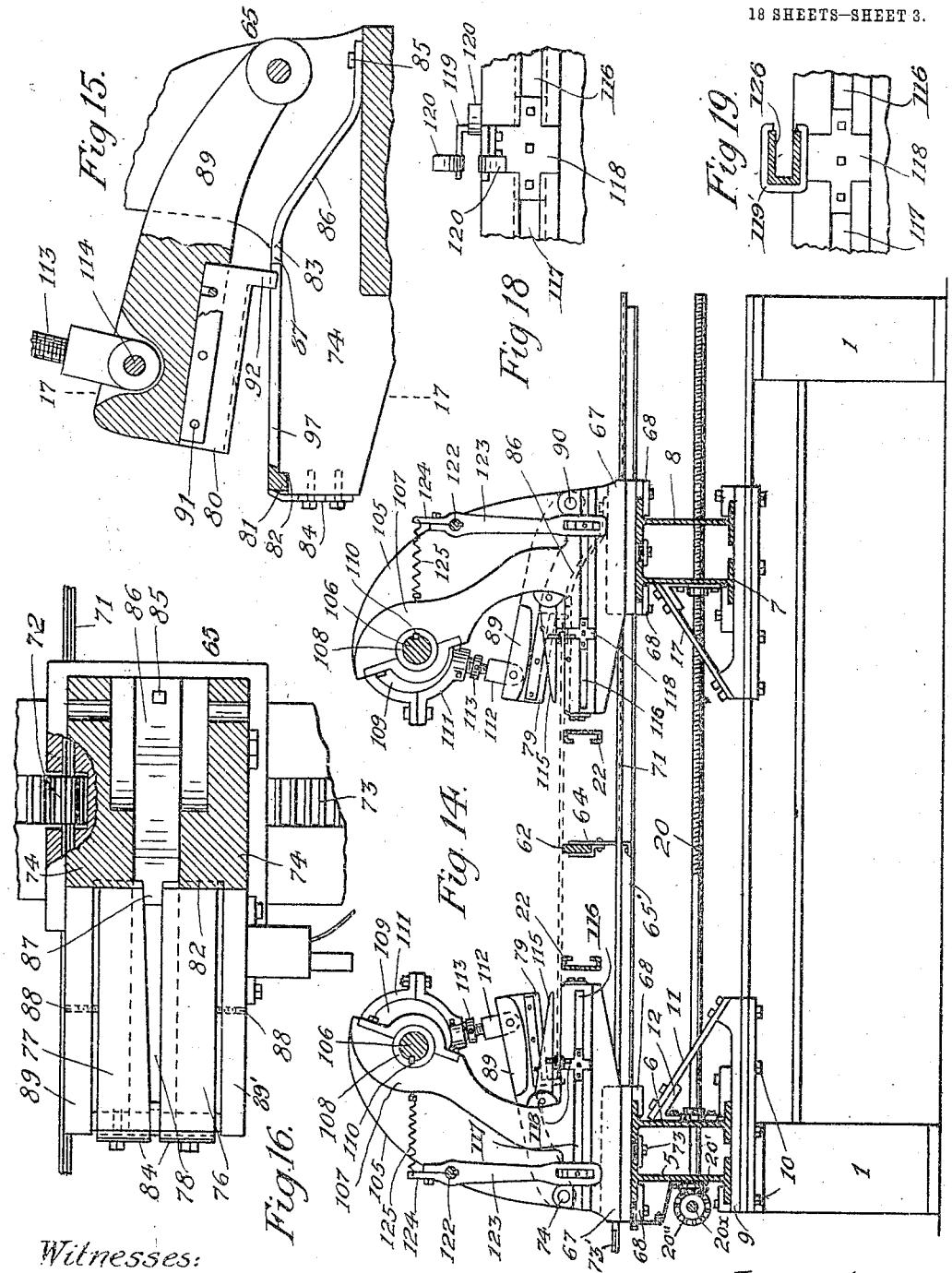

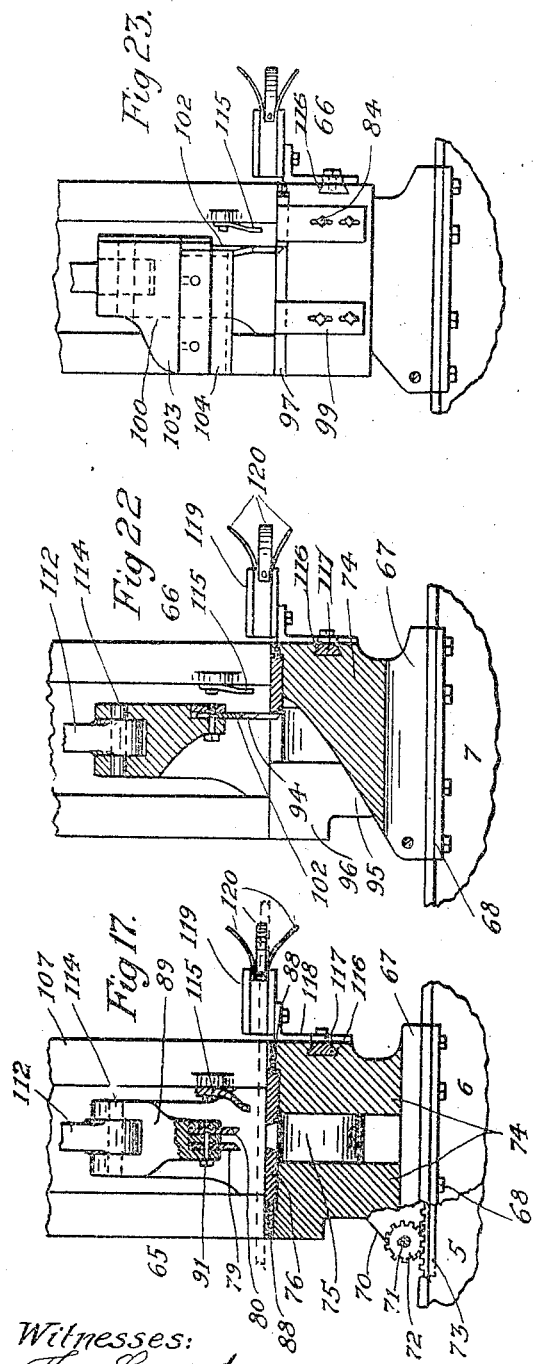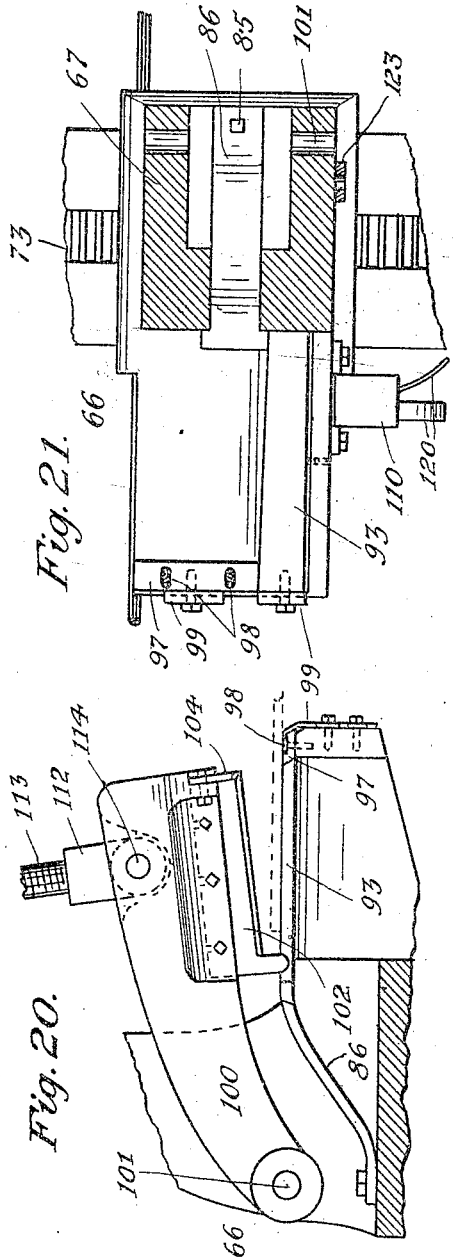

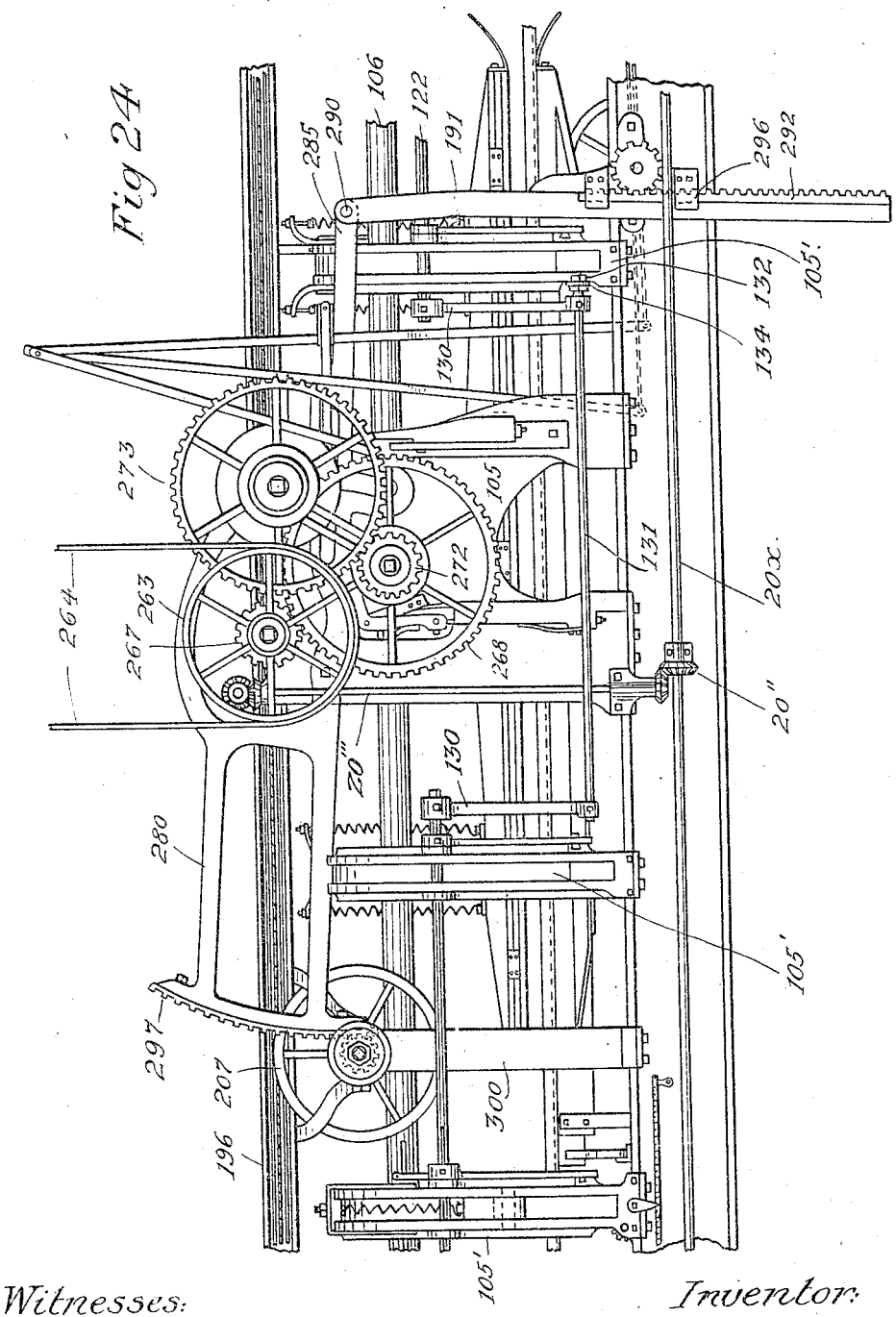

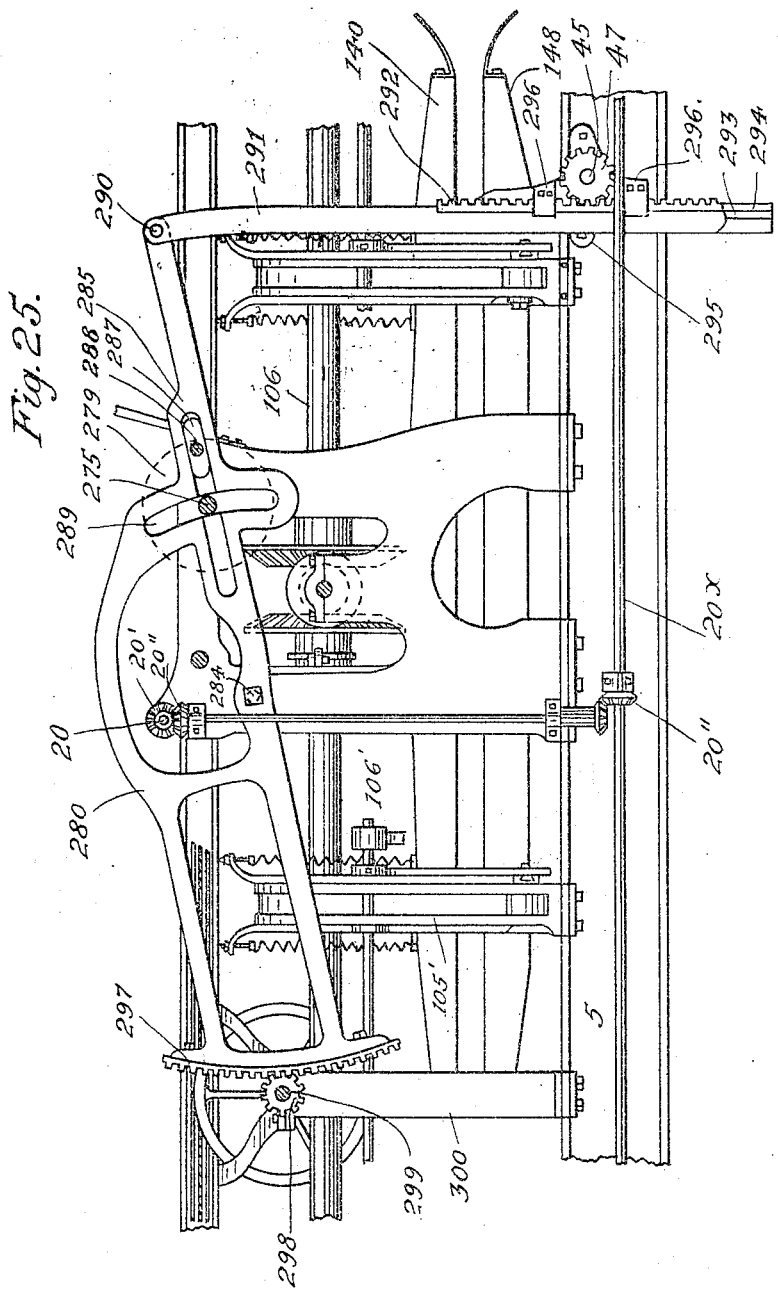

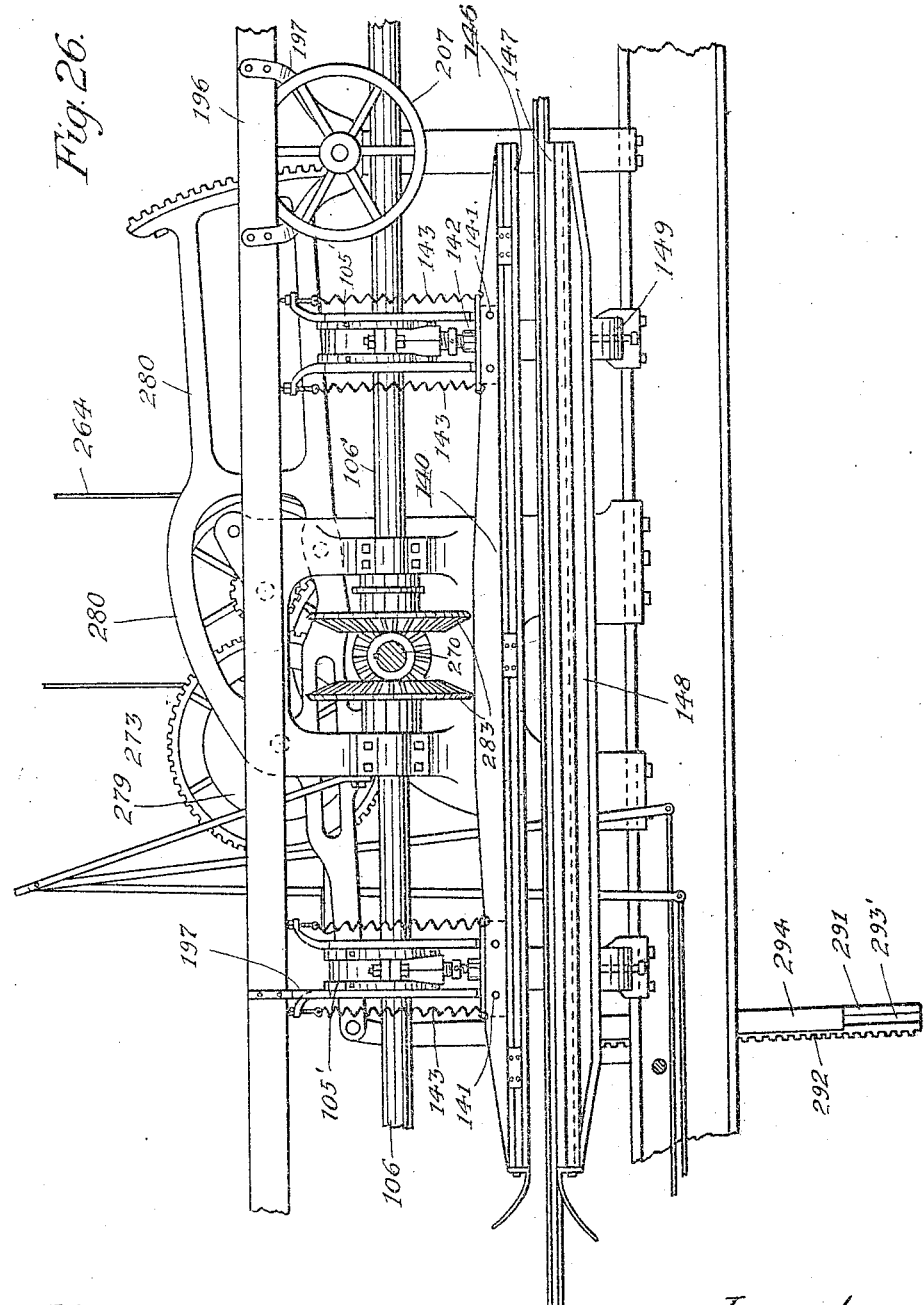

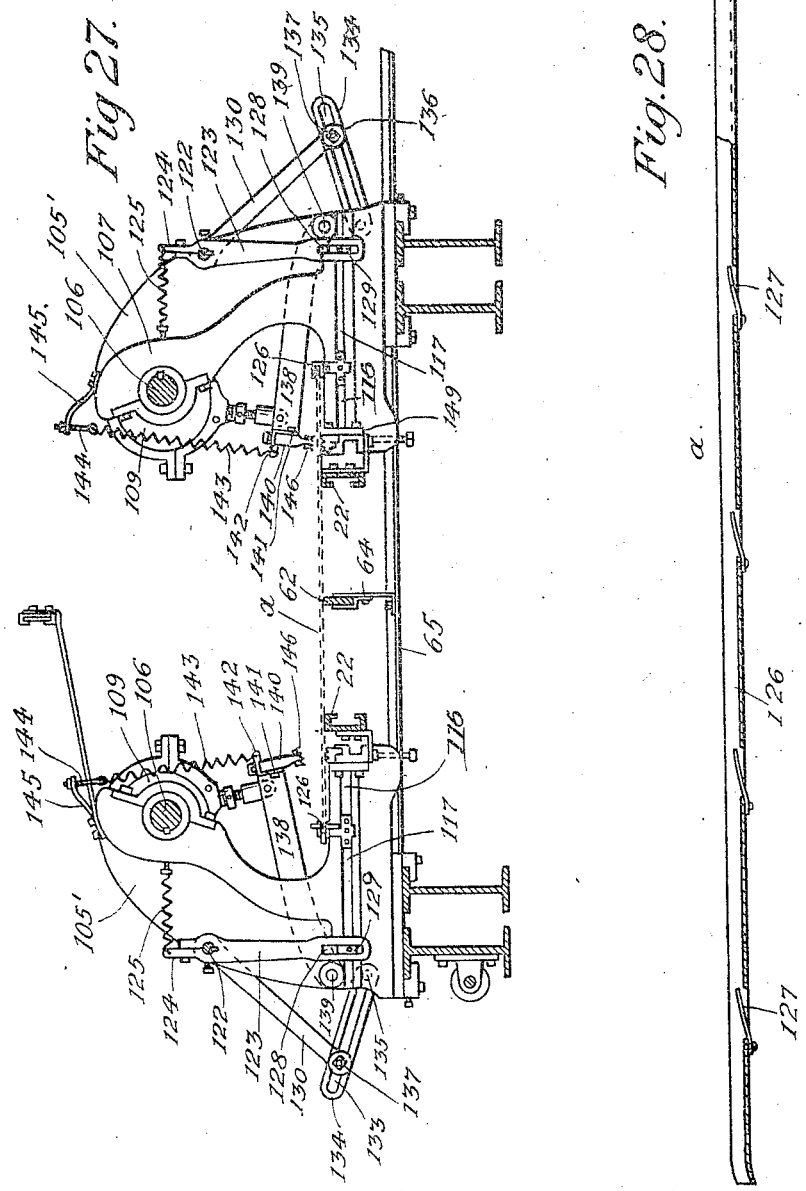

J. E. ERICKSON.
MACHINE FOR CUTTING AND CREASING BLANKS.
APPLICATION FILED JAN. 10, 1911.
1,058,165.
Patented Apr. 8, 1913.
18 SHEETS—SHEET 9.
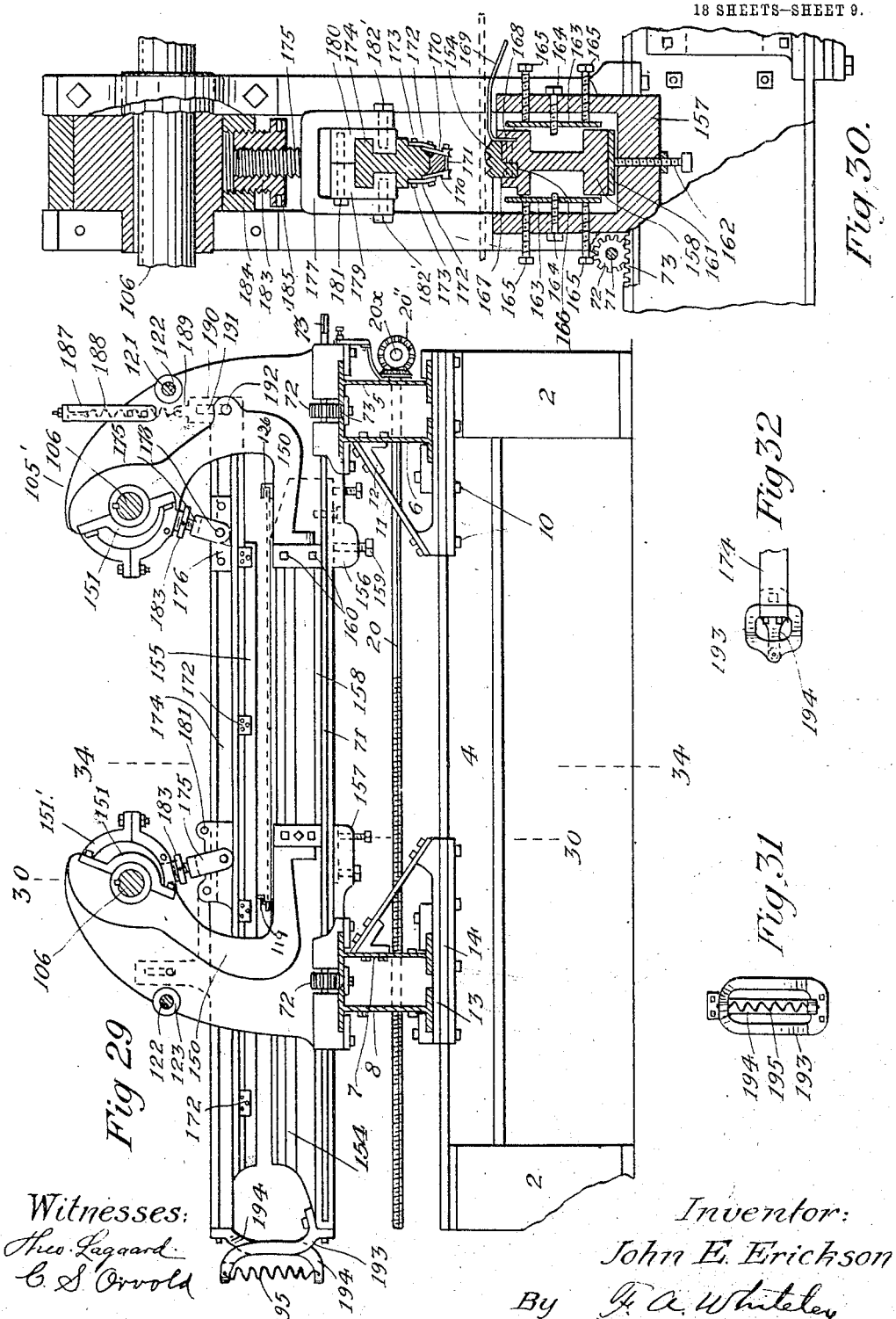
Witnesses:
Theo. Lagaard
C. S. Orvold
Inventor:
John E. Erickson
By G. A. Whiteley
his Attorney J. E. ERICKSON.
MACHINE FOR CUTTING AND CREASING BLANKS.
APPLICATION FILED JAN. 10, 1911.
1,058,165.
Patented Apr. 8, 1913.
18 SHEETS—SHEET 11.
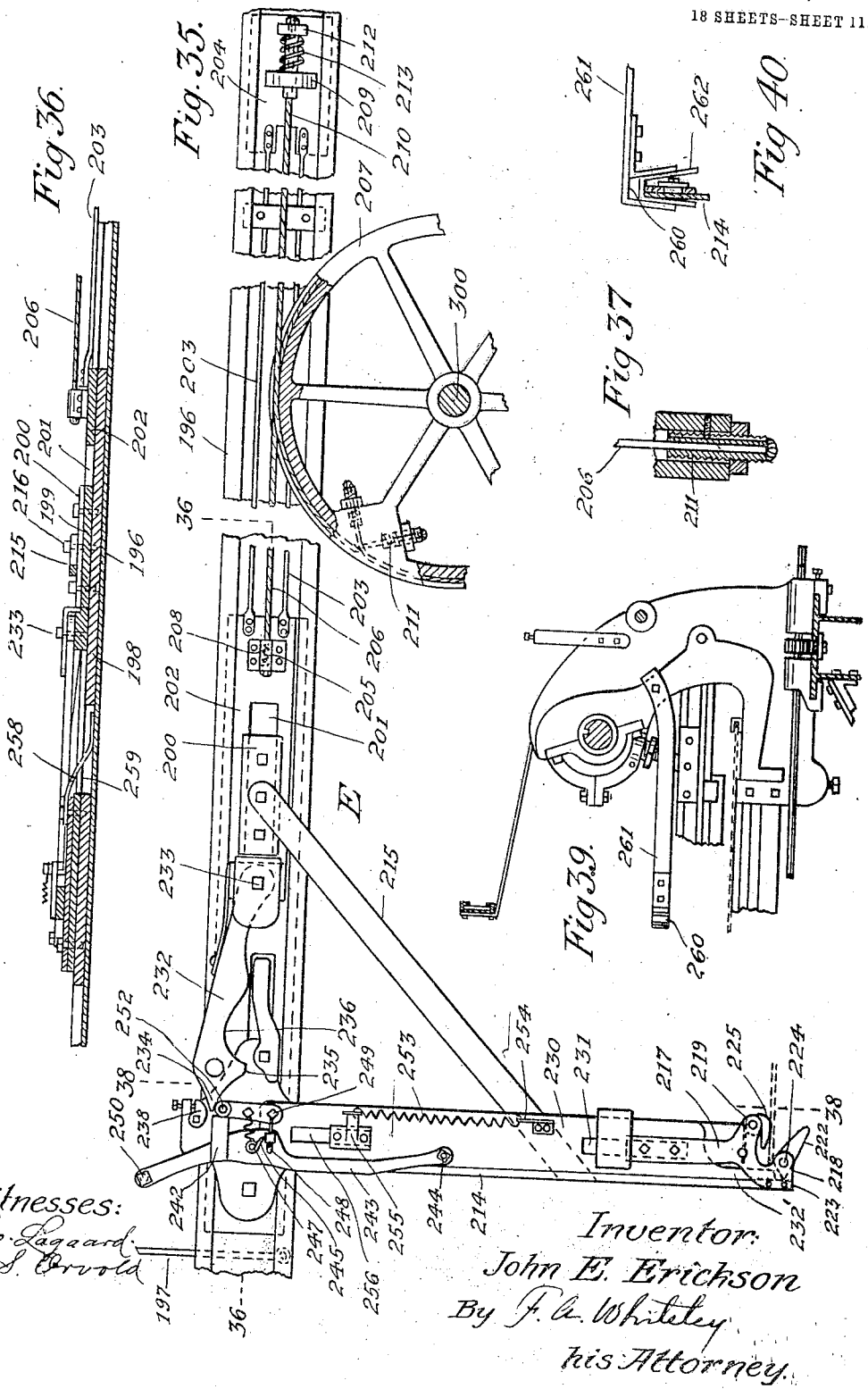
Witnesses:
Inventor:
John E. Erickson
By F. A. Whitley,
his Attorney.

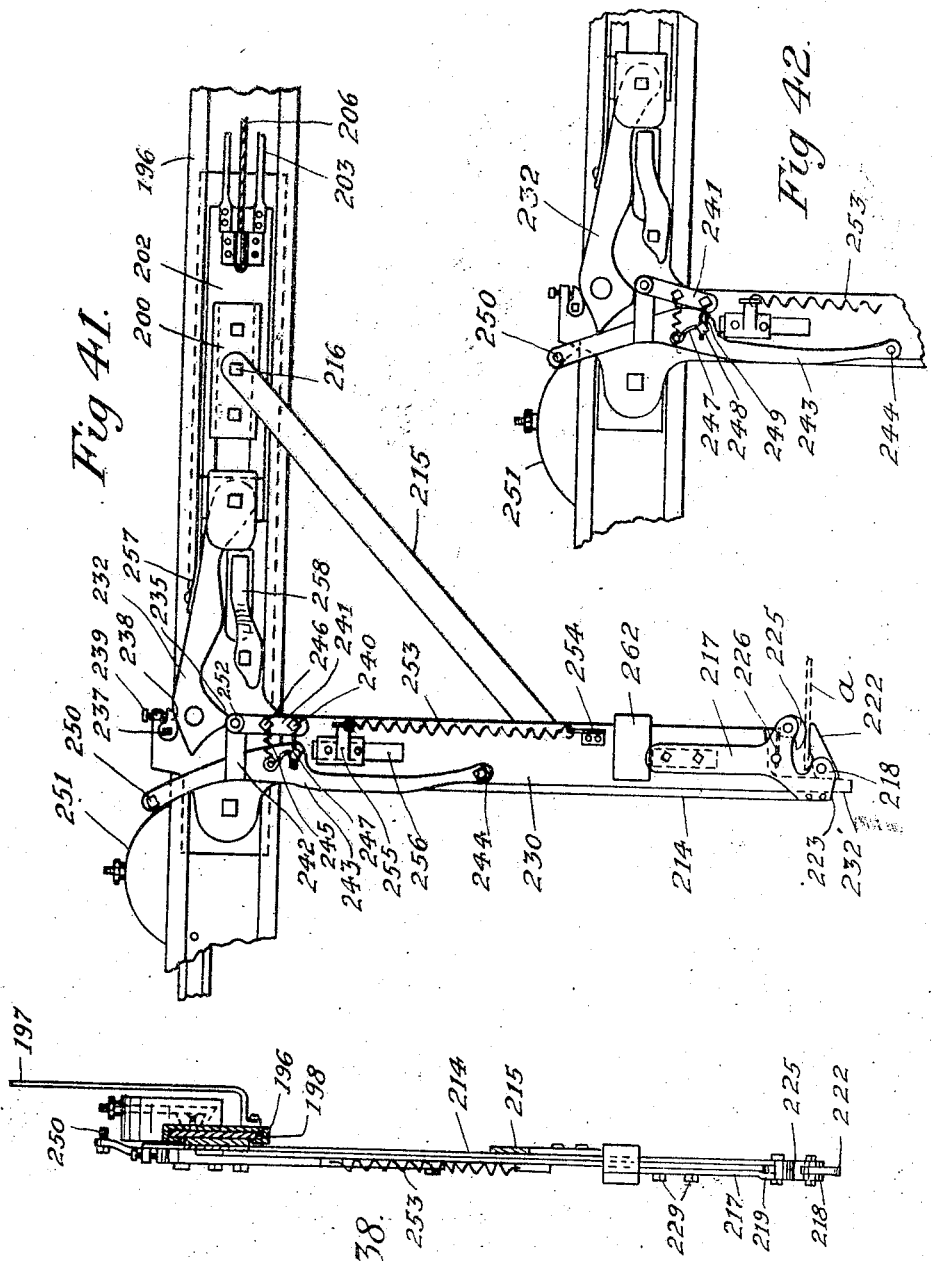

J. E. ERICKSON.
MACHINE FOR CUTTING AND CREASING BLANKS.
APPLICATION FILED JAN. 10, 1911.
1,058,165.
Patented Apr. 8, 1913.
18 SHEETS—SHEET 13.
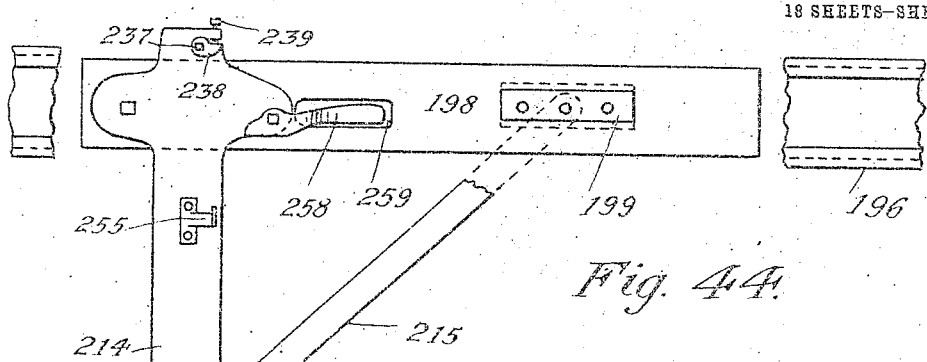
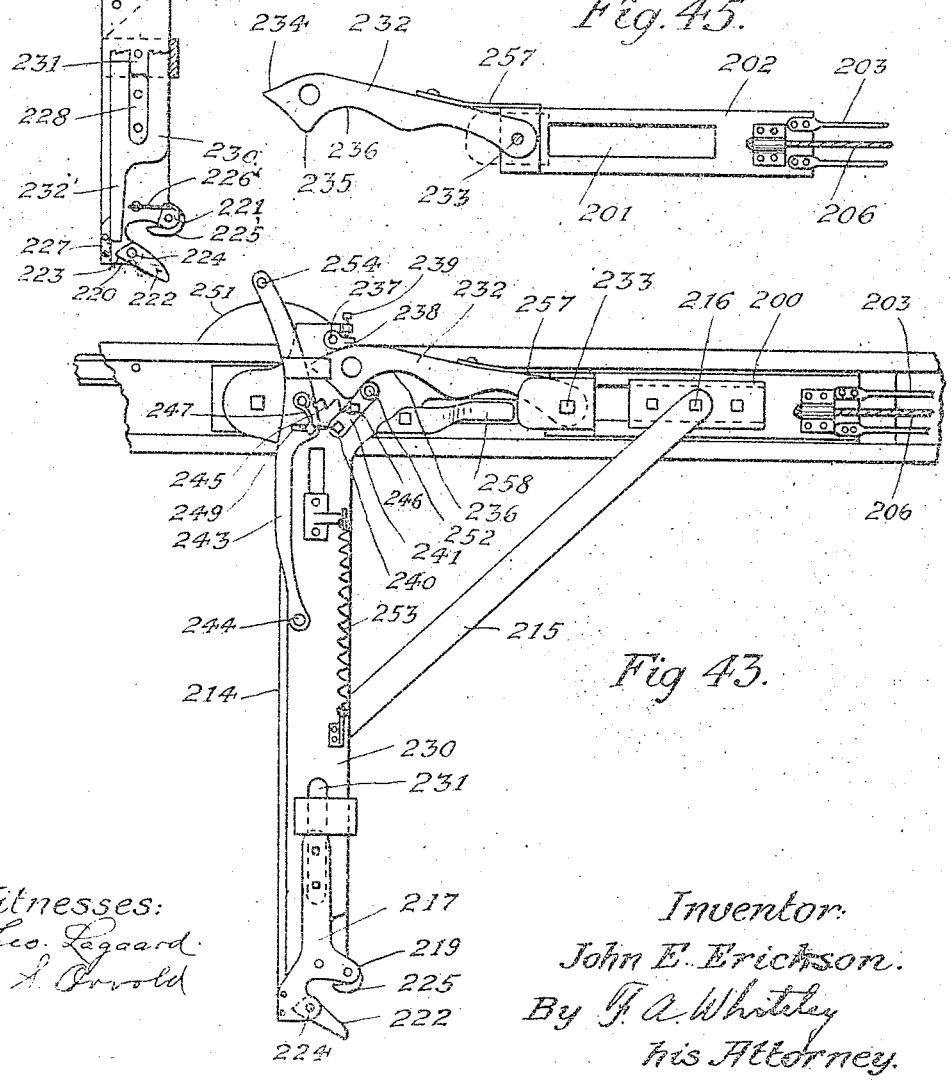

J. E. ERICKSON.
MACHINE FOR CUTTING AND CREASING BLANKS.
APPLICATION FILED JAN. 10, 1911.

1,058,165.

Patented Apr. 8, 1913.

18 SHEETS—SHEET 14.

Fig 46.

Witnesses:
Theo. Laquard
C. S. Orvold

Inventor
John E. Erickson.
By F. A. Whiteley
his Attorney

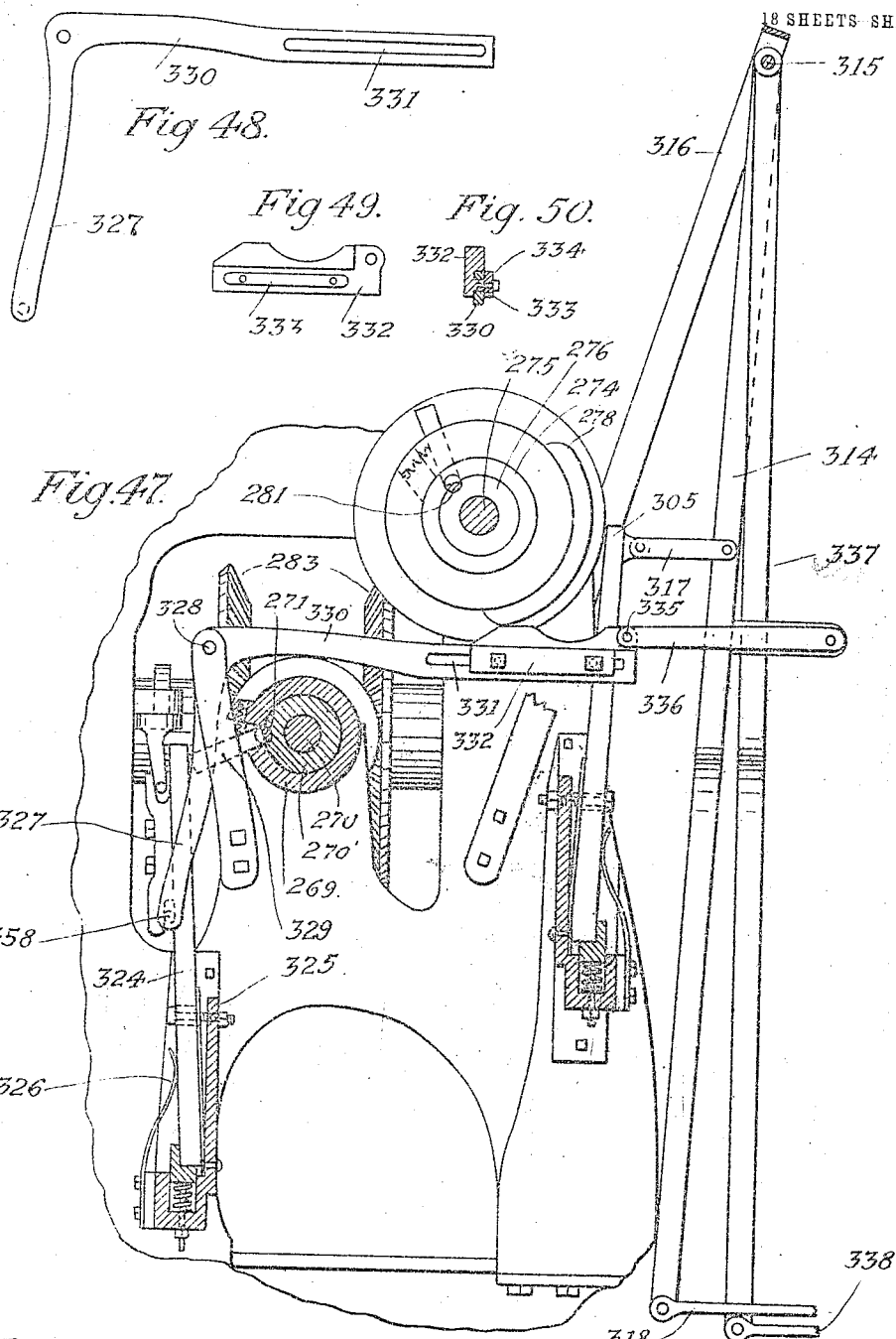

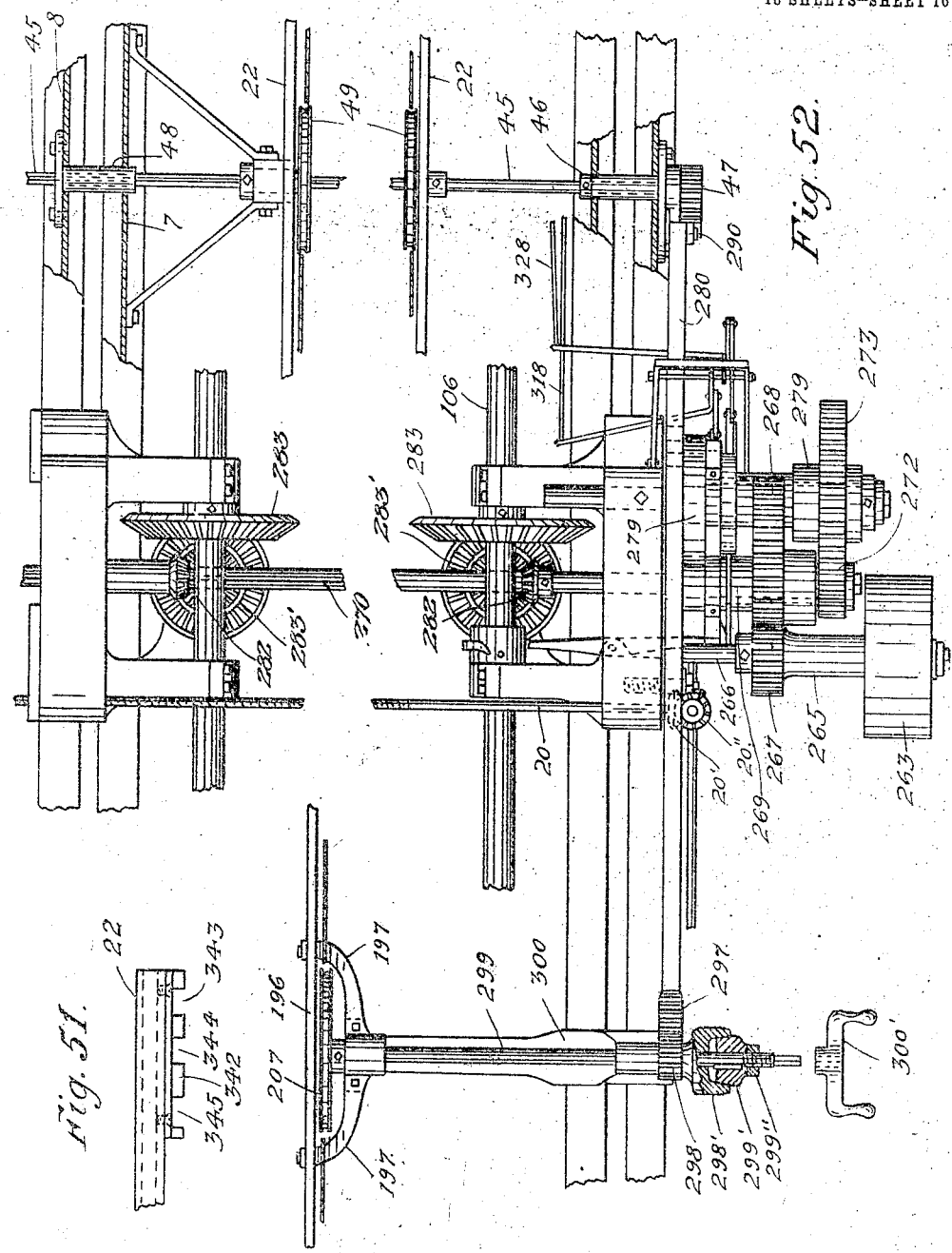

J. E. ERICKSON.
MACHINE FOR CUTTING AND CREASING BLANKS.
APPLICATION FILED JAN. 10, 1911.

1,058,165.

Patented Apr. 8, 1913.
18 SHEETS—SHEET 17.

Witnesses:
Theo. Lageard.
C. S. Orvold

Inventor:
John E. Erickson.
By J. A. Whiteley
his Attorney.

J. E. ERICKSON.
MACHINE FOR CUTTING AND CREASING BLANKS.
APPLICATION FILED JAN. 10, 1911.
1,058,165. Patented Apr. 8, 1913.
18 SHEETS—SHEET 18.
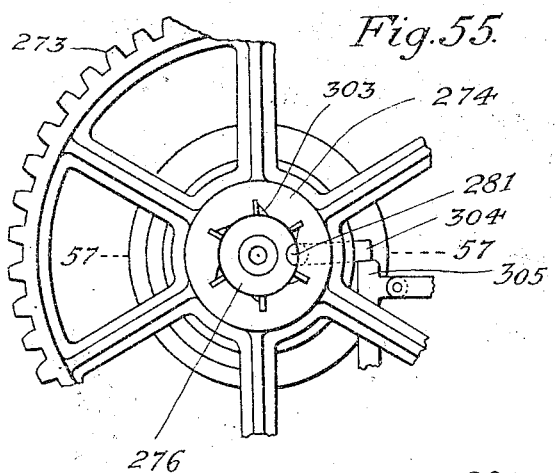
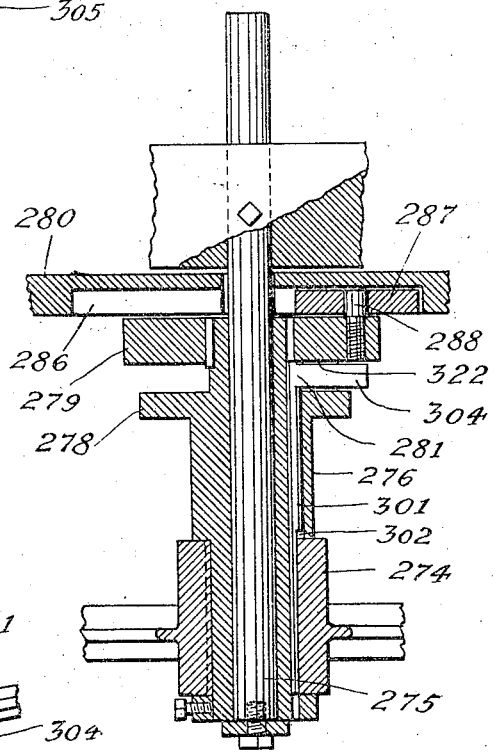
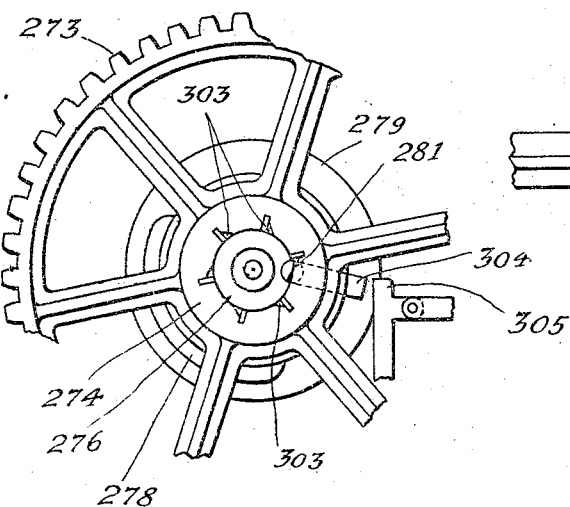
Witnesses:
Theo. Lagaard
C. S. Orvold
Inventor:
John E. Erickson.
By F. A. Whiteley
his Attorney.

UNITED STATES PATENT OFFICE.

JOHN E. ERICKSON, OF ST. PAUL, MINNESOTA.

MACHINE FOR CUTTING AND CREASING BLANKS.

1,058,165.   Specification of Letters Patent.   Patented Apr. 8, 1913.

Application filed January 10, 1911. Serial No. 601,772.

*To all whom it may concern:*

Be it known that I, JOHN E. ERICKSON, a citizen of the United States, residing at St. Paul, in the county of Ramsey and State of Minnesota, have invented certain new and useful Improvements in Machines for Cutting and Creasing Blanks, of which the following is a specification.

My invention relates to improvements in machines for operating upon blanks of fiber board to be used for making boxes, and more especially to such blanks of a peculiarly thick and heavy nature where it is desired to make unusually strong and heavy boxes.

My object is to provide a machine of improved and particularly simple construction for making the desired cuts in the edges and from the corners of the blanks, which will crease the same both longitudinally and transversely in proper relation to the cuts, which will automatically feed the blanks to the different positions for the successive operations thereupon with absolute accuracy, thereafter delivering the blanks from the machine, which is rapid in operation and easy and certain of control, and which is adjustable in all of its parts so as to permit operations in different relative positions upon blanks of varying sizes for making boxes of any desired size or shape.

Further objects and advantages of my improvements will appear in connection with the detailed description thereof and are particularly pointed out in the claims.

Figure 34:
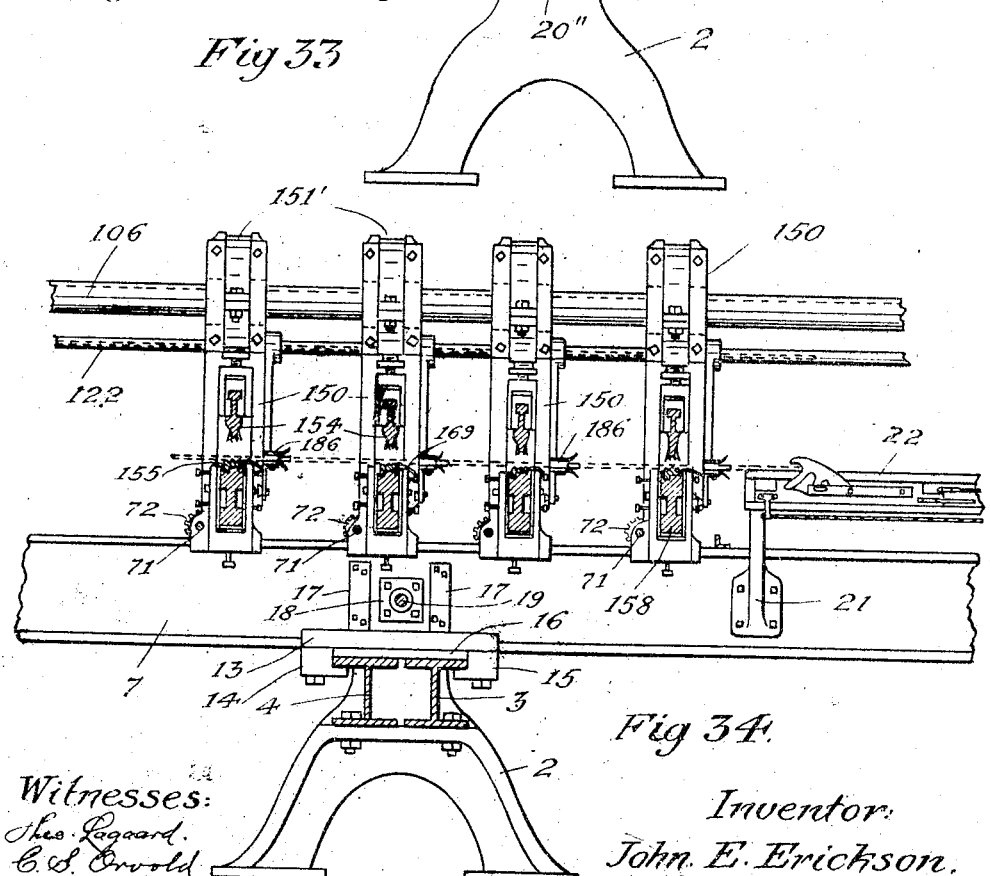
Figure 53:
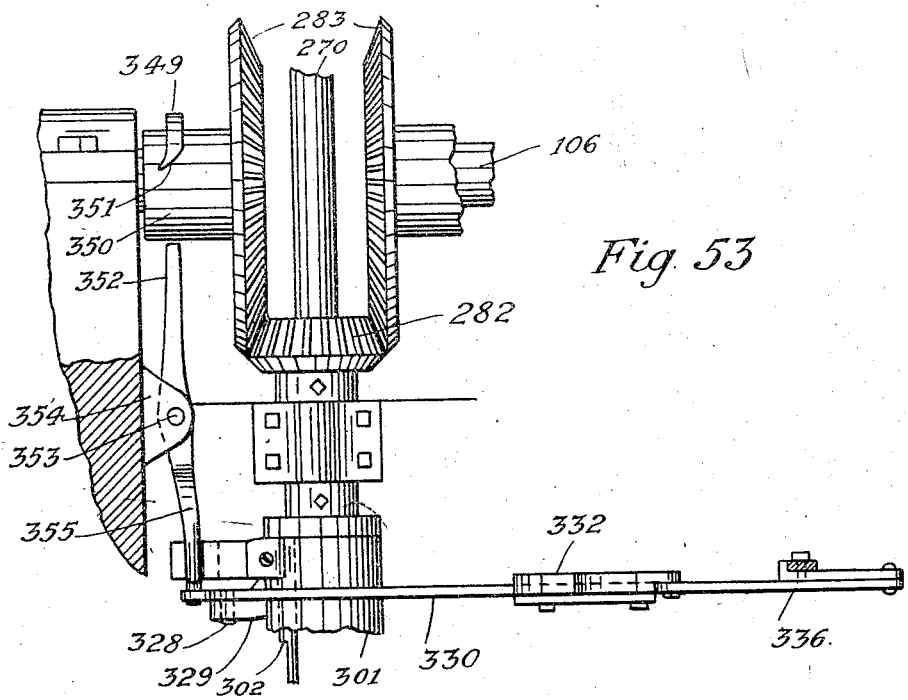
Figure 54:
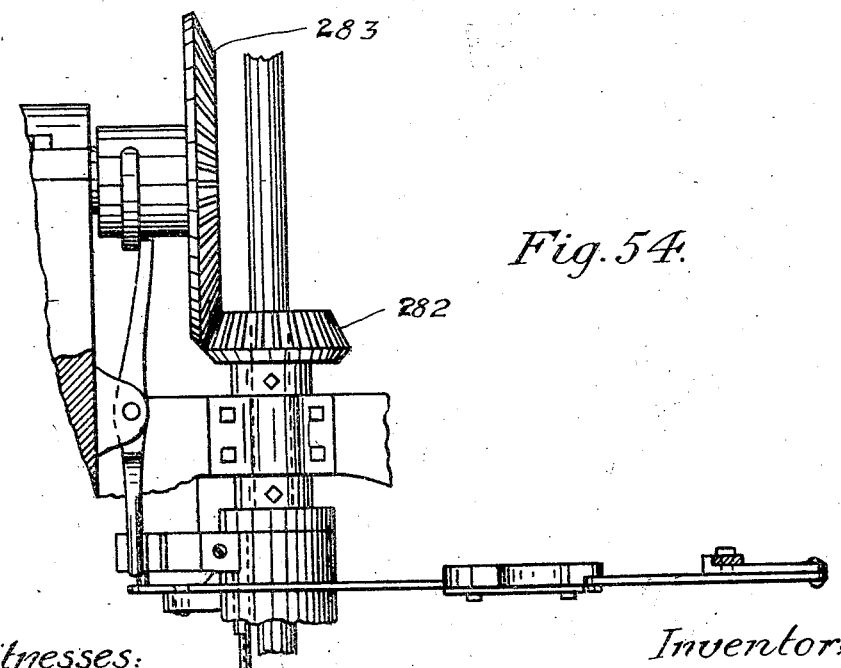

In the drawings, illustrating one form of my invention—Figure 1 is a plan of the entire machine. Figs. 1ª, 1ᵇ, 1ᶜ, 1ᵈ, 1ᵉ are views of the blank, showing the conditions thereof at different stages of its progress through the machine. Fig. 2 is a side elevation of the entire machine. Fig. 3 is a section on line 3—3 of Fig. 1. Figs. 4, 5, and 6, are detail elevation views of the conveying mechanism, part of the operating drum being shown in broken section. Figs. 7, 8, 9, 10, and 11 are views of details of the conveying mechanism. Fig. 12 is a section on line 12—12 of Fig. 5. Fig. 13 is section on line 13—13 of Fig. 6. Fig. 14 is a section taken on line 14—14 of Fig. 2. Fig. 15 is a detail sectional view of one of the cutters. Fig. 16 is a sectional plan view of the form with which the cutters act. Fig. 17 is a section on line 17—17 of Fig. 15 with both knives shown. Fig. 18 is a detail end view of the guiding device for the blanks. Fig. 19 is a fragmentary sectional view showing the manner of holding long guide 126 in position on the transverse creasing members. Figs. 20 to 23 are detail views of the cutting knives. Fig. 24 is an elevation of part of the machine viewed from the same side as in Fig. 2, showing the longitudinal creasing devices and connections for controlling the machine. Fig. 25 is a similar view with gears removed and parts in a different position. Fig. 26 is a view similar to Fig. 24, but viewed from the opposite side of the machine. Fig. 27 is a section across the machine on line 27—27 of Fig. 1 with some parts omitted. Fig. 28 is a detail in longitudinal section of the guide channel for the blanks under the right hand longitudinal creasing member. Fig. 29 is a section on line 29—29 of Fig. 1. Fig. 30 is a partial section in enlarged scale on line 30—30 of Fig. 29. Fig. 31 is an end view and Fig. 32 is a top plan of the spring holding means for pushing the transverse creasing bars away from one another. Fig. 33 is a side elevation of that part of the machine for creasing the blanks transversely viewed as in Fig. 2. Fig. 34 is a section on line 34—34 of Fig. 29. Fig. 35 is a side view of the blank removing mechanism in position for receiving the sheet. Fig. 36 is a section on line 36—36 of Fig. 35. Fig. 37 is a sectional detail of the connections to the driving drum. Fig. 38 is a section on line 38—38 of Fig. 35, showing an end elevation of the blank removing finger. Fig. 39 is an end view of the blank removing mechanism and coöperating stop. Fig. 40 is a detail view of the stop. Fig. 41 is a side view of the blank. Fig. 42 is a view of the tripping device on the blank removing mechanism when about to release the blank. Fig. 43 is a view of the blank removing mechanism after releasing the blank. Figs. 44 and 45 are views of independent details of the blank removing mechanism. Fig. 46 is a sectional elevation through a portion of the machine, showing the clutches for operating the blank feeding means and the cutting and creasing means, respectively, both in inoperative position. Fig. 47 is a similar view showing both clutches operative. Figs. 48 to 51 show independent details of the clutch operating devices. Fig. 52 is a plan of a portion of the machine with some parts broken away or omitted, showing the driving mechanism and connections. Figs. 53 and 54 are similar plan views of the device for preventing premature stopping of the cutting and creasing devices. Figs. 55 and 56 are enlarged detail views of the novel clutch employed, showing the same in two different positions. Fig. 57 is a section along the stub-shaft through the clutching mechanism on line 57—57 of Fig. 55.

The blanks to be operated by my machine may be of any type of pasteboard composition and of any degree of thickness or weight, it being a special feature of my machine that it will perform upon such thick and heavy blanks the operations necessary to prepare said heavy blanks for ready folding into the necessary form for producing the heavy boxes which it is desired to make from said blanks. The mechanism required to perform these operations, therefore, must be of particularly substantial type and the feeding devices for the blanks of such a nature as to positively grip and feed the blanks into the successive positions in which the different operations upon said blanks are to be performed, and said feeding means must be adjusted to coöperate with each of said operating devices so as to position the blanks with absolute accuracy for each successive operation.

The relative position of the blanks as they are fed through the machine, together with the operations performed upon said blanks, is shown in relation to Fig. 1 by the Figs. 1ª to 1ᵉ, inclusive, of the blanks a. In the position shown in Fig. 1ª, the blank is laid upon the receiving platform of the machine, designated generally by reference character "A." From this position, the blank is positively fed to its second position, shown in Fig. 1ᵇ, where the devices for making the narrow V-shaped cuts b and the corner cuts b', as shown in Fig. 1ᵇ, operate upon the blanks, and which devices are represented in their entirety by the reference character "B." The blank is then fed to its third position in the machine where it is operated upon by the mechanism for longitudinally scoring or creasing the blanks, as shown at c in Fig. 1ᶜ, which longitudinal creasing mechanism is designated in its entirety by the reference character "C." From this position, the blank is positively fed to its fourth position in the machine where it is operated upon by mechanism for making the transverse creases d, shown in Fig. 1ᵈ, and which transverse creasing mechanism is represented generally by the reference character "D." This completes the operation of the machine upon the blanks, but additional means for removing the blanks from their fourth position in the machine and depositing them outside of the machine in the relative position shown in Fig. 1ᵉ are required and provided, and this blank-withdrawing means is designated in its entirety by reference character "E." As each of the means "B," "C," and "D" successively operate upon the blanks in coöperation with the means for feeding the blanks to their successive operative positions, a description of the devices for effecting each of these operations in the order stated will aid in a clear understanding of the mechanism and coöperation of parts comprising the machine as a unitary instrument for cutting and creasing blanks.

Securely bolted to the rear supporting members 2 are two heavy transverse eye-beams 3 and 4 in spaced relation to one another, as shown in Fig. 34, similar transverse members, and similarly disposed, connecting the front supporting members 1. Longitudinal eye-beams 5 and 6 extending along one side of the machine, in spaced relation to one another, and similar eye-beams 7 and 8, similarly disposed along the other side of the machine, provide a framework upon which the different members of my complete cutting and creasing mechanism are mounted, and these sets of eye-beams are secured to the transverse members 3 and 4 in the following manner, the purpose being to obtain a mounting for the said members that will permit a relative adjustment transversely upon said members 3 and 4 for the accommodation of blanks of varying widths. The eye-beams 5 and 6 are stationarily secured to the frame upon bed-plates 9 clamped to the cross-beams 3 by bolts 10, and interiorly braced by members 11, bolted to the bed-plates 9, and angle irons 12 bolted to the eye-beams 6, as shown in Fig. 14. The longitudinal eye-beams 7 and 8 are secured to bed-plates 13. To these bed-plates 13 are bolted angle members 14 and 15 on either side thereof, so as to embrace the edges of the eye-beams 3 and 4, upon the top of which and beneath the bed-plates 13 is a bearing plate 16 upon which the bed-plate 13 is adapted to slide. The eye-beams 7 and 8 are braced to the bed-plate 13 by members 17, corresponding to the members 11 for bracing the eye-beams 5 and 6, and bolted to the eye-beams 7 between said braces 17, is a nut 18, in which is a threaded opening 19 for engagement with threads on shafts 20 connecting the two sets of longitudinal members. On one end of each of the shafts 20 is a bevel gear 20' meshing with similar bevel gears 20'' on a shaft 20ˣ mounted in bearings on the side of the longitudinal member 5, said shaft 20ˣ being provided with a hand wheel, so that by turning said hand wheel the threaded shafts 20 will be rotated and the longitudinal members 7 and 8 will be transversely adjusted on the members 3 and 4. One of said shafts 20 may extend between the top portions of the castings 105, as shown in Figs. 24 and 25, being operated by a bevel gear 20″ on a vertical shaft 20‴ mounted to be driven by a bevel wheel 20″ on the shaft 20ˣ.

To the inner longitudinal I-beams 6 and 7, respectively, are bolted a series of brackets 21, one of which, and the manner of attachment to the longitudinal members 7, is shown in Fig. 34. To each set of bracket arms 21, on either side of the machine, are bolted longitudinal guide-ways 22, a view of which, showing the cross-sectional form of the guide-ways 22, is given in Fig. 12. These guide-ways 22 are for the purpose of housing and supporting reciprocating feeding devices, of which the forward feeding member thereof is designated 23, and each of the two rear members thereof, being identical in form and function, is designated by the reference character 24. The guide-ways 22 extend back underneath the feeding-platform A, as shown in Fig. 1, and the feeding members 23 coöperate to feed the blanks from their position on said platform to the second position to be operated upon by the devices B, as shown in Figs. 1 and 2, stops 25, as shown in Figs. 1 and 3, being provided against which the operator places the blanks to position them for engagement with the feeding means. The feeding devices 23 and 24 are connected to move in unison by links 26, movement of one member thereby causing movement of each of the other feeding members. Each of the feeding members 23 comprises a hook member 27 of peculiar shape, the member 24 having hook members 28 of different shape and differently disposed in the feeding means 24 from the disposition of the hook members 27 in the feeding means 23, and this difference in form and disposition of the respective hook members of the different parts is all that distinguishes the front feeding means 23 from the rear sets of feeding means 24. The hook members 27 are disposed in the forward portion of the feeding device and have a hook 29, a top cam-face 30, a rear cam-face 31 and a central cam-opening 32, all designed to coöperate in a manner and for a purpose to be described.

The hook members 28 each have a hook 33, pointing in the same direction as the hook 29 but oppositely with respect to the body of the hook member 28. The hook members 28 are also provided with a top cam-portion 34 and a central cam-opening 35. Each of the feeding devices consists primarily of a plate 36, having thereon a longitudinal raised member 37, as clearly shown in Figs. 7 and 11, and these plates 36 are connected together by the links 26, before mentioned, and slide directly in the guide-ways 22. In conjunction with the plates 36, and adapted to have a limited movement therealong, are members 38, having thereon longitudinal slots 39, in which the members 37 register when the plates are assembled, and since the members 37 are shorter than the slots 39 the members 38 may slide along members 39 to a limited extent. Bolted to each of the raised portions 37 of the plates 36 are bracket pieces 40, as shown in detail in Fig. 9, the said bracket portion 40 being off-set at 41, as shown in Fig. 11, a front bolt 42 thereof operating as a pivot upon which the hook members 27 or 28 are adapted to rock. In the forward portion of the member 40 is a slot 42 equal in length to the difference in length of the raised members 37 on the plates 36 and the slots 39 in the plates 38. Through these slots 42, extend studs 43 having thereon anti-friction rollers 44, as shown in detail in Fig. 10, and these rollers 44 are adapted to coöperate with the cam-faces in the openings 32 or 35 of the front and rear hook members, respectively, for the purpose of raising and lowering the hook members 27—28 in the manner hereinafter described. To a transverse shaft 45, held in a bearing 46 and having thereon a gear 47 in operative connection with driving mechanism at the left hand side of the machine, said shaft 45 passing through and beyond a bearing 48 in the longitudinal members 7 and 8, as shown in Fig. 52, are secured drums 49, about which is coiled a pair of driving ropes 50—51. The driving rope 50 passes through an opening 52 in a special casting on one of the spokes of the drum, being removably secured therein by the nut 53, the other end of said driving rope 50 being attached to a member 54 bolted to plate 38 of the middle feed member 24. One end of the driving rope 51 is similarly fastened to the drum 49 by a nut 55, as shown in Fig. 5, the other end of said driving rope 51 being secured to a member 56, attached to the plate 38 of the rear feeding device 24. All of the adjacent plates 38 in the feeding members 23—24 are connected together by links 57 so that movement imparted to any one of said plates through either of the driving cords 50—51 will be uniformly transmitted to each of the plates 38, and movement to the feeding members as a whole, and more especially the hook members 27—28 thereof, must be effected through the plates 38. Since, therefore, the plates 38 are connected with the plates 36 by means of the projections 37 in the slots 39 and the covering plates 40, and since said projections 37 are shorter than the slots 39, each of the plates 38, and the friction rollers 44 carried thereby, during the first period of its movement in a longitudinal direction, will have a movement independent of the plates 36, the effect of which will be to cause the stud 44 to operate through the slot 42 in the member 40, on the cam-faces of the opening 32 in the hook members 27—28, to cause said hook members to rise above the top of the longitudinal guide members, as the plates 36 start to move in the direction of feeding through the machine, and cause the hooks to fall or recede below the top or feeding plate of the guide-ways 22 when the motion begins in the reverse direction, as will be clearly understood from an inspection of the Figs. 4 to 13, inclusive. Since the drums 49 are oscillated on the shaft 45, it follows that the feeding members 23—24 will be reciprocated and the hook members 27—28 raised or lowered at the beginning of each reciprocation according to whether the same is in a forward or a backward direction.

To insure bringing the hooks into a raised position before the feeding operation begins, the plate 38 of the forward feeding member 23 has at the front end thereof a raised projection 58 adapted to coöperate with a stop 59 adjustably attached by the bolt 60 through the slot 61 therein to the end of the guideway 22. When, therefore, the plates 38 are brought to the end of their movement by the cords 51, they come sharply in contact through the members 58 with the stop 59 bringing them quickly stationary, and the plates 36 connected by the link 26 and bearing the hook members 27—28 continue, by reason of the momentum acquired from the stroke of the return reciprocation, for some distance, which may be as far as the slot 39 will permit, thus causing the rollers 44 to engage the upper cam-face of the openings 32—35 and thereby bring the hooks into practically their raised position. On the forward reciprocation of the feeding means, each of the three pairs of hooks will grip a blank and feed the same forward to the next successive position for operation thereupon, the first set of hooks feeding to position 2, where the cutting mechanism B operates thereupon the second set of hooks feeding the blank to position 3 where the longitudinal creasing devices C operate thereupon, and the third set of hooks feeding to position 4, where the final operation of transversely creasing the blank is performed by mechanism D. From this fourth position the blanks are removed from the machine by mechanism subsequently to be described. For steadying the center of the blanks as they are fed through the machine, a bar 62 is loosely mounted on supports 64 bolted to cross members 65', which will be hereinafter described.

I will now describe the instrumentalities B for cutting the V-shaped notches $b$ and the corner notches $b'$ from the blanks. The edge cutting mechanism B comprises members 65 on either side of the machine of exactly similar character for cutting the V-shaped notches $b$ in the edges, and a member 66 on each side of the machine for cutting out the corner notches $b'$. All of these members 65 and 66 are alike in mode of operation and manner of mounting in the machine, the members 66 differing only in the relative arrangement of the cutting knives. A description, therefore, of the mounting and operation of any one of these devices will properly describe all of them. As shown in detail in Figs. 16 and 17, each of the members 65 is mounted primarily in a casting 67 adapted to slide along one or the other of the pairs of longitudinal eye-beams 5—6 and 7—8, respectively, and is held in embracing engagement therewith by flange members 68 bolted to the castings 67 so as to over-lap the outer flanges of the eye-beams 5 and 6 or 7 and 8, respectively, as clearly shown in Fig. 14. Each of the castings 67 has ears 70 at the lower front side thereof, in which are journaled shafts 71 extending to opposite sides of the machine, the said shafts being held from longitudinal movement in the journal of the member 67 at the left hand side of the machine and loosely passing through the journal of the member 67 on the right hand side of the machine, so as to extend for a certain distance there-beyond, as clearly shown in Fig. 14, the purpose being to permit the shaft 71 to slide in said journal when the longitudinal frame members 7—8 are adjusted transversely across the machine. Fast on the shaft 71, at the left hand side of the machine, and splined thereto at the right hand side of the machine are gears 72 meshing with a longitudinal rack 73, mounted between the eye beams 5—6 and 7—8, respectively. The left hand end of the shaft 71 is squared off as shown at 73', so that by applying a removable crank thereto and turning shaft 71, opposite pairs of casting members 67 will be uniformly and similarly adjusted on the sets of longitudinal eye-beams for the purpose of varying the distances between the different pairs of members 67 to make cuts for different forms or sizes of boxes. The castings 67, of the members for cutting the V-shaped notches, have upwardly extending anvil-like members 74 with an opening 75 therebetween, and upon the top of said members 74 are two shear plates 76—77, respectively, having therebetween the V-shaped opening 78 with which the cutting-knives 79—80 coöperate in cutting out the V-shaped notches from the edges of the blanks. The plates 77—78 are provided with downwardly turned extensions 81 for engaging the cut-out portion 82 of the members 74, the ends of the plates being beveled at 83, as shown in Figs. 15 and 16, for engagement with a cut-away beveled portion of the members 74. Spring clamping devices 84, bolted to the ends of the members 74, hold the plates 77—78 removably upon the said members 74. Bolted to the casting 67 at 85 is an upwardly rising spring member 86, the tongue 87 of which registers between the inside ends of the plates 76—77, as shown in Fig. 16. Setscrews 88 pass through upstanding portions 89' of the members 74 and engage the plates 76—77. By loosening either or both of the spring-clamps 84 and operating the setscrews 88, the shear plates 76—77 may be adjusted toward or from each other to vary the relative angularity of their edges with respect to one another. Also, as noted, the plates 76—77 are easily replaceable when broken or worn out.

The cutting knives 79-80 of the members 65 are mounted upon a holder 89 pivoted at 90 to members 74, said cutters being mounted in slots in said holders 89, removably secured therein by means of bolts 91. One end of the cutters is provided with a downward extension 92, which is always in engagement with the shear plates with which the particular cutter coöperates, and this insures accurate engagement of the cutters with the shear plates. The members 66 for cutting out the corner notches b' are shown in Figs. 20 and 23, inclusive. In these, the plates 93 and cutting knives 94, for making the transverse cuts out of the corners of the blanks are the same as in members 65. One of the upstanding portions 74, is, however, cut away at 95, as shown in Fig. 22, to form an end support 96 for the shear plate 97, for making the longitudinal corner cut, this shear-plate 97 being secured to the support 96 by screw and slot means 98, as shown in Fig. 21, coöperating with a spring clamp 99, so that the plates 97 may be adjusted on the supports 96. The manner of securing the spring clamps 84 and 99, by means of bolt and slots, is shown clearly in Figs. 20 and 23.

Holders 100, for the corner cutting devices 66, are pivotally mounted at 101 and have knives 102 similar in form and similarly mounted for removal to the knives 80 for making the transverse corner cuts. Practically at right angles to the knives 102, carried by projections 103 of the holders 100 are removably mounted longitudinal cutting knives 104 for coöperation with the shear-plates 97, as shown in Fig. 23.

Rigidly mounted upon the longitudinal members 5—6 and 7—8, respectively, are heavy upstanding castings 105. These castings provide bearings for shafts 106 extending throughout the length of the machine, at either side thereof. Said shafts may be each composed of two portions 106—106', as shown in Figs. 1, 25, and 26, or the shafts may comprise a single member 106 extending throughout the length of the machine, as shown in Fig. 52. From these shafts 106, all of the cutting members 89 and all other members for performing the different operations on the blanks, in the successive different positions which the blanks occupy in the machine, are driven, so that the shafts 106 comprise a unitary means for synchronously operating the cutting devices, the longitudinal creasing devices, and the tranverse creasing devices. The manner of rotating the shafts 106 will be subsequently described. Upon each of the castings 67 are upstanding members 107, having therein bearings 108 through which the shafts 106 loosely pass. Housed within the members 107 are eccentrics 109 which are caused to rotate with the shafts 106 by means of splines 110, but are free to move along the shafts 106 when the members 65 or 66 are adjusted on the longitudinal members for the purpose of varying the distances between the different cutting members. Removable eccentric straps 111 surround the eccentrics 109 and are adjustably connected through the links 112 and threaded adjusting screws 113 with the knife carrying members 89, being pivoted thereto at 114. This arrangement for oscillating the members for operating upon the blanks is generally the same for each set of operative devices. There are a series of cutting devices and also a series of transverse creasing devices and I have found it advantageous to operate each member of each of said series at a slightly different time from each preceding member. This is especially desirable in connection with the transverse creasing of the blanks, where the best results can be obtained if the blank is free to crawl or move slightly on either side of the creasing means, which would not be the case if all of the transverse creasing means operated simultaneously. I accomplish the dissimultaneous or successive operation of each member of the series of the edge cutting devices and each member of the series of transverse creasing devices by splining the eccentrics 109 on the shafts 106 in a manner such that the relation of the maximum eccentricity between the successive eccentrics is varied. This differential positioning of the successive eccentrics is such as to just permit the preceding operating member to complete its operation upon the blank before the next succeeding operating member begins such operation on the blank.

To prevent the blanks from jumping up as the cutters rise after cutting the V-shaped notches in the blanks, I provide springlike holding members 115, bolted to the side of the upstanding members 107, as clearly shown at Fig. 17.

Since one of the important objects of my machine is to adapt it to operating upon blanks of different sizes for making boxes of different sizes, means must be provided for holding said blanks as they are positioned beneath the cutters so that the cutters will operate to make a V-shaped notch in the blank of the proper depth. The blank holding means will, therefore, need to be adjustable along the length of the shear plate holding surface 77, and hence adjustable on the support 74, of said shear plates. On one side of each of said supports 74 is formed a dovetailed groove 116, in which operates a correspondingly formed sliding member 117, to which is bolted a support 118 for the blank edge guiding member 119, as clearly shown in Figs. 14, 17, 18 and 19, there being, of course, a guiding member for each of the cutting devices 65—66. The guiding members, as shown, comprise a bottom plate, an upstanding edge guiding plate, and an overhanging top guiding plate. To each of these guiding plates are secured outwardly curved members 120, as clearly shown in Figs. 17, 18, and 19, for certainly receiving the corner of the blank as it is fed forward and guiding the same into the proper position for operation thereon.

Secured in bearings 121, in the members 105, are rock-shafts 122 at either side of the machine. Splined upon said rock-shaft 122 so as to be rocked thereby but to be movable along the same when the members 65—66 are adjusted longitudinally of the frame members are depending arms 123, the upper ends 124 of said arms are connected by springs 125 to the members 107, as shown in Figs. 14 and 27, it being understood that the guides for the blanks attached to the longitudinal creasing members, shown in Fig. 27, are in all respects identical with the guides for the cutting members and are simultaneously operated therewith, excepting only that the guides for said longitudinal creasing members comprise a single long guide 126, as shown in Fig. 28, having in the blank edge guiding portion spring members 127 for justifying the position of the blank, if the same shall tend to crawl to either side after the operation of the first of the longitudinal creasing devices said springs 127 preferably being provided on one side only. The member 126 on the left hand or fixed side of the machine is extended as best shown in Fig. 33 past the transverse creasing members 150 at that side of the machine, said extended guide bar 126 being mounted to slide freely in socket members 119′ carried by the said supports 150 for the transverse creasing members, so that the bar 126 at that side of the machine in addition to guiding the blanks past the longitudinal creasing members is mounted on all of the supports for the transverse creasing members on one side of the machine, although said supports may be adjusted relatively to one another on the longitudinal beams 7 and 8 and along the guide bar 126. As the notches have been cut from the edges of the blanks before the transverse creasing members operate and the creases in no case extend farther than the beginning of said notch, the position of the inner end of the transverse creasing member will be fixed and adjustment of the guides will be such as to bring that inner end out to the beginning of the notch, regardless of the size of the blanks or the depth to which such notch is extended. In the lower portion of each of the arms 123 is a slot 128 in which registers a block 129, pivoted to the sliding member 117. Fast on each of the shafts 122 are arms 130, said arms being connected by a bar 131. An extension 132 of said bar 131 passes through the slot 133 of a slotted holding member 134, pivoted at 135 to one of the castings 105, a hand-nut 136 operating to clamp the bar 131 to the pivoted holding member 134 in any desired position. The springs 125 tend to keep all of the arms 123 in their outward position for making cuts of maximum size. When it is desired to adjust the guides so as to reduce the length of the cuts, the hand-nut 136 is loosened, when the operator pushes the bar 131 inward. This rocks the shaft 122 and all of the arms 123. The movement of the arms 123 is translated to the sliding members 117 through the block and slot connection 129, and the guides 119 and 126 are moved toward each other to reduce the depth of the cuts and correspondingly position the blanks with respect to the transverse creasing means. When the proper adjustment is reached with respect to the blanks $a$, the operator will secure the bar 131 to the slotted holding member 134 by means of the hand-nut 136, and such adjustment will remain fixed until it is desired to change the same for operation upon different sized blanks or to make a different shaped box.

Since the longitudinal creasing members comprise a set of unitary creasing bars longitudinal of the machine, there will need to be no adjustment lengthwise thereof for blanks of different lengths. The carrying members 138, therefore, are pivoted at 139 directly to the frame members 105, and, as previously noted, are operated by eccentrics 109 mounted in said members 105, the mounting and operation of said eccentrics to oscillate the carriers 138 being in every respect the same as that of the eccentrics for operating the cutting members. The upper longitudinal creasing bars 140 are bolted to the end of the carriers 138 at 141 and also to an extension of said carriers 142, as clearly shown in Figs. 26 and 27. Springs 143 are connected at one end to the extension 142 and at the other by means of an adjustable bolt 144 to brackets 145 attached to the members 105 at either side thereof, there being two such springs for each of said members, as shown in Fig. 26. The creasing bars 140 are provided at the lower edge thereof with fluted creasing members 146 which coöperate with similar fluted members 147, carried by lower longitudinal creasing bars 148 rigidly bolted at 149 to the bottom portions of the castings 105.

Attention is called to the showing in Fig. 27 of the relative position of the creasing members 140 at opposite sides of the machine, the eccentrics being arranged, as previously stated, so as to permit operation of one of the creasing means before operation of the other. The transverse creasing means are carried by castings 150, which are similar to and mounted for adjustment on the longitudinal members 5—6 and 7—8 in substantially the same manner as the members 65—66 carrying the cutting devices, the shafts 106 passing loosely through bearings in said members 150 and having splined thereon eccentrics 151 for operating the transverse creasing bars and at the same time permitting the members 150 to be adjusted on the longitudinal supports and the shaft 106. The adjustment is performed in precisely the same manner as in the case of the members 65—66 for holding the cutters, by means of a crank operating shafts 71 extending across between the members and carrying gears 72, engaging the rack 73 between the pairs of eye-beams comprising the longitudinal members. As shown in Fig. 33, each of the castings 150, and also each of the similar castings 65—66 for the cutting members, is provided with a pointer 152 arranged to extend over a scale 153 attached to the member 5, so that the distances apart of the individual members 150 or 65—66 can be readily gaged. In each pair of castings 150, on opposite sides of the machine, are mounted lower transverse creasing bars 154 and upper transverse creasing bars 155.

The manner of mounting the lower creasing bars in the castings 105 is shown in detail in Figs. 29 and 30. The castings 150 are bifurcated or formed with two upwardly extending side portions, as clearly shown in Figs. 30 and 33, and the castings at the operative side of the machine are provided with inwardly extending base members 156, the castings 150 on the opposite or transversely adjusting side of the machine having similarly disposed base members 157. Carriers 158 for the lower creasing bars are mounted upon these base members 156—157, said carriers being directly secured to the base members 156 by means of bottom bolts 159 and side-bolts 160, as shown in Fig. 29. The creasing bars extend through and beyond the castings 150 on the adjusting side of the machine, and are held upon the base member 157 and between the side members of the castings 150 so as to permit said castings to be adjusted transversely of the machine and at such times to slide along the members 158. To accomplish this result, a plate 161 is provided upon the base member 157 and adjustably held thereon by means of the screw-bolt 162. Similar side plates 163 are secured to the side-walls of the castings 150 by means of bolts 164 passing through said side-walls and threaded into plates 163. Other bolts 165 are threaded into the side members of the casting 150. By operating the two sets of bolts 164 and 165, respectively the side plates 163 may be accurately adjusted to closely embrace the holding bars 158 and at the same time permit movement thereof along said bars. The carrier bars 158 are provided in the top thereof with a longitudinal slot 166 in which fits a depending portion 167 of the lower creasing bars 154, the said creasing bars 154 being thus removably held on the carrying bars 158. In another slot 168, is fastened a transverse guiding member 169 for guiding the blank as it is fed forward up over the lower creasing bars, as clearly shown in Fig. 30. The upper creasing bars 155 have the cross-sectional form, shown in Fig. 30, and comprise outside creasing plates 170 bolted to a central bar 171, which central bar is, in turn, secured by fastening plates 172 and bolts 173 to a carrying bar 174. This carrying bar 174 is of the form shown in Fig. 30 with two longitudinal grooves in the sides thereof. At the operating side of the machine, the carrier bars 174 are directly fastened to connecting rods 175 extending from the eccentrics 151 by means of members 176 which register in said grooves and are bolted to the carriers 174, and to which the lower forked end 177 of the connecting rod 175 is pivoted at 178. On the adjusting side of the machine two members 179—180, so shaped as to provide depending hook-like portions for registering in the grooves of the carrying bar 174, are bolted together by bolts 181 above said carrying bar 174 and to these members 179 and 180, respectively, the members of the fork 177 from the connecting rod 175 are pivotally connected by pivot bolts 182, as shown in Fig. 30. This arrangement permits adjustment of the operating devices along the transverse creasing members without interference with the operation of said transverse members, whatever may be the position of adjustment of the longitudinal supporting members 7—8 and the parts carried thereby. It is a matter of very great importance that the creasing members be adjusted with respect to their engagement over one another in operating upon the blanks, and to effect this adjustment the connecting rods 175 are threaded into adjusting nuts 183 which are, in turn, threaded into an opening 184 in the eccentric straps 151'. The adjusting nuts 183 are provided with openings 185 for the reception of an ordinary adjusting pin used for such purposes. Guiding devices 186 similar in form to the guiding devices 119, previously described, are directly attached to the forwardly extending base members 156 and 157.

As in the case of the longitudinal creasing members, it is desirable that the transverse creasing members should be pulled away from each other by means of springs so that the creasing action may be uniform. To effect this result, each of the castings 105 at the operating side of the machine, has bolted thereto brackets 187 to which are connected springs 188, which, in turn, are connected to the lug 189 attached to the upper creasing bar carriers 174, the said lug being on an extension 190 in which is a slot 191. Through this slot 191 projects a pin 192 between the side members of the casting 105, the purpose of which being to prevent the upper creasing bar from moving in a circle and to cause the same to reciprocate vertically. To the end of the lower bar carrier 158 is bolted a bracket 193 of the shape shown in Figs. 29, 31, and 32. A similar bracket 194 is bolted to the upper carrying bar 174. To the overhanging ends of the brackets 193—194, is connected a spring 195, the two springs 188 and 195 operating to normally draw the creasing bars apart as desired.

The means for withdrawing the blanks after the last operation thereon, generally designated by "E", comprises a guideway 196 of substantially the same form as the guideways 22 for the blank feeding means, the guideway 196 being held in a position above the other mechanism of the machine by means of brackets attached to the frame members 5 and 6 on the operating side of the machine, which brackets may extend rearwardly above the rear end of said guideway 196 and connect thereto by means of hangers 197, as shown in Figs. 35 and 38, or said hangers may extend directly from the frame of the building in which the machine is positioned. Mounted within the guideway 196, so as to have a movement therealong is a plate 198. Bolted to said plate 198 is an extension 199 having a cap 200, said extension 199 extending through a slot 201 in a second plate 202. The slot 201 is longer than the extension 199 so the second plate 202 will have a limited movement on the plate 198. The plate 202 is connected by links 203 to a front operating member 204 mounted to slide in the guideway 196. Upon the front end of the plate 202 is bolted a hasp 205 through which passes a connection 206 to an operating drum 207, said connection being provided with a spring 208 for taking up shock. On the member 204 is a projection 209 through which a cord or flexible connection 210 passes, said flexible connection being fastened at one end, as indicated at 211, to the drum 207, the other end of said flexible member 210 passing through the member 209 and being fastened to a headed device 212, a spring 213 between said head and the member 209 operating to take up shock in the movements of the parts. It will thus be seen that any movement communicated to the plate 198 from the drum 207 must be transmitted through the plate 202 mounted thereupon. Bolted to the plate 198, is a depending hanger 214 which hanger is connected by a brace 215 to the plate 198 by a bolt 216, which passes through the brace 215, the holding member 200, the raised extension 199 and into the plate 198, as clearly shown in Fig. 36. Upon the lower end of the plate 214 is bolted a member 217 having two forwardly projecting portions 218—219, the bottom portion of the plate 214 being provided with similar forwardly projecting portions 220—221, respectively, as shown in Fig. 44. Pivoted between the members 218—220 is a dog 222 having a cam-extension 223 extending rearwardly from the pivot 224. Between the members 219—221, is another dog 225 having a lower curved surface adapted to coöperate with the upwardly curved surface of the dog 222 to form a gripping means for the blanks, the dog 225 being held in its outward position by a spring 226. Between the members 217 and 214, at the lower end thereof, is bolted a guidepiece 227, another guidepiece 228 of elongated shape being bolted between said members 217 and 214 at 229. Upon the plate 214 is mounted another plate 230 having therein a slot 231 longer than member 228 which embraces said member 228 so that the plate 230 will have a limited sliding movement up and down on the plate 214, a downward extension 232' of said plate 230 being adapted to coöperate with the guiding-piece 227 and the cam-member 223 on the dog 222 to swing such dog on its pivot 224 when the plate 230 is lowered and cause the dog to rise into operative position for gripping a blank, as shown in Fig. 41.

To operate the cam plate 230 in the depending member 214 a cam finger 232 is provided, said cam finger being pivoted at 233 to the plate 202, as shown in detail in Fig. 45. As shown, the cam finger 232 has a pointed end 234 and a depending portion 235, back of which is a hollowed out portion 236, these characteristics of the cam finger being for purposes to be hereinafter described. Upon the upper end of the depending member 214 is pivoted by means of a set screw 237 a cam lug 238, which may be adjusted by means of an adjusting screw 239, this cam lug being immediately above the longitudinal line of movement of the point 234 of the cam finger 232. Pivoted to the cam plate 230 at 240, said pivot 240 being directly below the cam lug 238, is an operating and locking member 241, which is normally held in a substantially vertical position against a lug 242 on an arm 243 pivoted at 244 to the cam plate 230, by means of a spring 245 attached to the locking member 241 at 246 and connected with the plate 230 by means of a spring holding device 247, as clearly shown in Figs. 41 to 43, said member 243 being further secured to the cam plate 230, to have a limited movement thereon about the pivot 244, by means of a bolt 248 passing through a slot 249 in said member 243, to which bolt the spring holding member 247 is directly attached, the arm 243 being provided with a short offset arm 250 to coöperate with a fixed cam 251 and throw the member 241 into non-locking position and positively move the cam plate 230 on the depending member 214, as will now be explained.

When the drum 207 is rotated in a rearwardly direction, through the flexible connection 210, the forward plate 204 and links 203, the plate 202 is moved rearwardly, such motion being upon the plate 198, by reason of the fact that the slot 201 is longer than the extension 199 on the plate 198 registering in said slot. This movement of the plate 202 on the plate 198 will carry the cam finger 232 rearward, the point 234 thereof first entering between the cam lug 238 and the lug 252 on the end of the locking and operating member 241, further movement of the cam finger rearwardly against the fixed cam lug 238 on one side and the cam lug 252 on the member 241 on the other side of said cam finger, will cause the same to force the locking and operating member 241 downward and with it the cam plate 230, until the plate 202 reaches the limit of the movement on the plate 198 permitted by the slot 201, when the depending portion 235 of the cam finger 232 will occupy the position shown in Fig. 41, in which, by means of said cam finger and the locking member 241 the cam plate 230 is locked in its lowered position, downward movement thereof having caused the cam extension 232 thereon to engage the cam extension 233 on the gripping finger 222 thereby causing said gripping finger to swing upwardly into coöperative engagement with the blank a between said gripping finger 222 and the gripping finger 225. The blank is thus gripped and held between the fingers 222 and 225, any movement or force tending to withdraw the blank therefrom operating to cause the gripping fingers to hold yet more tightly by reason of the rolling contact of the gripping surface of the finger 225 permitted by the spring 226. Further movement rearward of the plate 202 will now be transmitted to the plate 198, which will carry the depending member 214 and the blank a gripped thereby rearwardly until the blank is removed from the machine. The fixed cam 251 may be placed on the guideway 196 at such a point as will be most convenient for the depositing of the withdrawn blanks. When the short arm or lug 250 on the arm 243 first comes in contact with the cam 251, the arm 243 will be swung forwardly on the pivot 244 and through the block or extension 242 push or trip the lug 252 on the locking member 241 from beneath the extension 235 of the cam finger 232, the said lug 252 riding into the cutaway portion 236 of the cam finger 232, as shown in Fig. 43, while the lug or arm 250 will ride up on the cam 251 thus positively raising the cam plate 230 and withdrawing the depending portion 232 thereof from coöperation with the gripping finger 222, thus permitting said finger to drop and release the blank. The spring 253, attached to the cam plate 230 at 254 and to a spring holding member 255 fast to the depending member 214 and extending through a slot 256 in said cam plate 230, operates to complete the upward movement of the cam plate and restore the same to inoperative position, in which it is normally held by said spring 253. Upon reverse movement being communicated to the plate 202 from the drum 207, said plate 202 will first be moved on the plate 198, thereby withdrawing the cam finger 232 from contact with the lug 252 on the locking member 241, whereupon the spring 245 will restore said locking member to its normal position, the leaf spring 257 upon the cam finger 232 operating to resiliently hold said cam finger in proper position for the next succeeding operation of the withdrawing devices. A brake 258 consisting of a leaf spring attached to the plate 198 over the depending member 214 and extending through a slot 259 in said plate 198 so as to bear against the wall of the guideway 196, is provided to retard movement of the plate 198 so as certainly to permit the limited movement of the plate 202 upon the plate 198 necessary to effect the proper operation of the gripping fingers through the cam finger 232. Upon the return stroke of the blank removing device the same will be brought in contact with a V-shaped stop 260 carried by an arm 261 bolted to one of the castings 105, as clearly shown in Figs. 39 and 40, said stop coöperating with a member 262 of similar shape carried by the depending member 214 in the proper position to register with said stop 260, the purpose of this device being accurately to position and steady the depending members and the jaw or gripping fingers carried thereby for the reception of the edge of the blank as it is fed into its last operative position.

The machine is driven from the main driving pulley 263 by a belt 264 connected with any suitable source of power. The pulley 263 is carried by a sleeve 265 which rotates on a stub shaft 266, said sleeve carrying a pinion 267. The pinion 267 meshes with a gear 268 on a sleeve 269 loose on another sleeve 270', said sleeve 270' being fast on a shaft 270 which is mounted in bearings on the castings 105 and extends across the machine, said sleeve 269 being arranged to be clutched to the shaft 270 by a clutching mechanism 271 to be hereinafter described. The sleeve 269 carries a pinion 272 which meshes with a gear 273 on a sleeve 274 loose on a stub shaft 275. There is also loosely mounted on the stub shaft 275 and within the sleeve 274 another sleeve 276 which sleeve carries a cam wheel 277 having thereon a cam 278 and a crank wheel 279 for operating a rocking member 280, to be hereinafter described, the sleeve 274 being adapted to be clutched to the sleeve 276 by a clutching device 281 similar to the clutching device 271. It will thus be seen that the sleeves 269 and 274, respectively, are constantly rotated, and since, as will hereafter appear, the clutches 271 and 281 are independently operable, it follows that either one or both of said sleeves 270' and 276, respectively, with the operative parts connected thereto, may be operated as desired.

The shaft 270 may be connected with the shafts 106 by means of a bevel gear 282 fast on said shaft 270 and meshing with two bevel gears 283 on sets of shafts 106 106' at either side of the machine, as shown in Figs. 26 and 53; or said shaft 270 may be positioned lower in the machine so that the gears 282 will mesh with horizontally disposed gears 283', centered below the shafts 106 and meshing with a single bevel gear 283 on the shafts 106 at each side of the machine, as shown in Fig. 52. As previously stated, the shaft 106 comprises the means for driving each of the members which operate upon the blanks.

The rocking member 280, which is best shown in Fig. 25, is for the purpose of operating the blank feeding and blank withdrawing means in timed relation. Said rocking member 280 is pivoted to the casting 105 at 284. One arm 285 of said member is provided with a longitudinal slot 286, and engaging said slot and adapted to slide therein is a piece 287 which is pivoted to a crank pin 288 of the crank wheel 279 before considered. When, therefore, the crank wheel 279 is rotated the piece 287 will ride back and forth in the slot 286 and the rocking member 280 will be rocked backward and forward by said rotating member 279. At right angles to the slot 286 is another slot 289 in the rocking member 280 the said slot 289 being formed in the arc of the circle whose center is at the pivot 284 of the rocking member 280. The shaft 275 passes through the slot 289, so that when the rocking member 280 is rocked on its pivot 284 said slot 289 will be oscillated over the shaft 275. This not only results in a convenient disposition of the shaft 275 but operates to steady the member 280 in its oscillating movements on its pivots 284. Pivoted to the arm 285 at 290 is a depending arm 291 which carries a rack 292. The arm 291 slides on a raised member 293 on a guide member 294 which is pivoted at 295 to the frame, said arm 291 being additionally guided by plates 296 bolted to the frame and overlapping the rack arm 291, as clearly shown in Fig. 25. The rack bar 291 has, as shown in Fig. 26, a slot 293' in which the raised member 293 on the guide arm 294 registers. As the rack 292 is oscillated by the rocking member 290 it is thus constantly held in engagement with the pinion 47 on the shaft 45 upon which are mounted the drums 49 for operating the feeding devices. It will thus be seen that for each rotation of the crank wheel 279 the rocking member will cause the rack 292 to make a complete reciprocation in each direction thereby rotating the drums 49 backward and forward and effecting a complete feeding movement and return of the feeding devices. The other end of the rocking member 280 has formed directly thereon a segment 297 in an arc having a center at the pivot point 284 and said segment 297 meshes with and drives a gear 298 fast on a shaft 299 mounted in an upright member 300 bolted to the longitudinal frame member 5, 6, the member 300, in addition to furnishing bearings for the shaft 299, providing a mounting for the bracket arms 197 which support a portion of the guideway 196 for the blank withdrawing devices. The shaft 299 carries the drum 207 for actuating the flexible connections 206 and 210 by which the blank removing device is operated. The gear 298 is loose on the shaft 299 and is provided with the clutching member 298' adapted to coöperate with a clutch member 299' splined on the shaft 299, as shown in Fig. 52. The clutch 299' is held in clutching engagement with the member 298' by means of a nut 299" threaded on the shaft 299. The shaft 299 is provided with a squared end for receiving a removable hand crank 300'. Upon loosening the nut 299" the shaft 299 may, by the crank 300', be rotated independently of the gear 298 the purpose being to adjust the position of the blank removing device on the guideway 199 to adapt the same for removing blanks of different sizes, the stop 251 being correspondingly adjusted on said guideway.

The clutches 271 and 281 are the same in form and method of operation so that the description of the clutch 281, shown in detail in Figs. 55 to 57, inclusive, will answer for both clutches. The main portion of the clutch 281 comprises a rod 301 having along a part thereof a cutaway portion 302. The rod is seated in the sleeve 276 so that when the same is turned in inoperative position the cutaway portion of the rod 301 will lie within the circumference of said sleeve 276 where the same is surrounded by the sleeve 274 so that said sleeve 274 may rotate freely about the sleeve 276, as shown in Fig. 55. On the inside of the sleeve 274 are series of seats 303. If, therefore, the rod 301 is turned when the same is opposite one of said seats 303, the cutaway portion 281 will be thrown away from within the circumference of the sleeve 276 and will enter the seat 303, thereby clutching the sleeve 274 to the sleeve 276 so that said sleeve 274 will cause the sleeve 276 to rotate therewith. Fast on the rod 301 is an arm 304, which when in engagement with a stop 305 is held in inoperative position with respect to the sleeve 274 and also positively holds the sleeve 276 from rotation. The arm 304 is pressed against the stop 305 by a spring 306. The stop 305 is carried by a stand 307 bolted to one of the frame members 105. The lower end of the stop 305 is loosely seated upon a member 308 which is adapted to slide in an opening 309 in the bottom of the stand 307, said member being forced upwardly by a spring 310. The stop 305 is also held to the stand 307, but so as to have a limited movement away from the same, by a bolt 311 which passes through an opening in said stop member 305 and is screwed into the rear wall of the stand 307, being fixed into properly adjusted position by a nut 312. The stop member 305 is normally held in its rearward position for engagement with the arm 304 of the clutch 281 by a strong leaf spring 313. To operate the stop and so release the clutch a link 314 is pivoted at 315 to a stand 316, said link depending from the pivot point and being connected by a link 317 to the stop 305 and by a link 318 to one arm 319 of a two-armed foot lever pivoted at 320 near the forward part of the machine, the other arm 321 of which is adapted to be operated by the foot of the operator. When, therefore, the operator presses downward on the arm 321 the stop 305 will be withdrawn from beneath the arm 304. Action of the spring 306 and gravity will tend to rotate the clutch rod 301 so that when the cutaway portion 302 thereof comes opposite one of the seats 303 in the sleeve 274 said rod will be rotated to cause the cutaway portion 302 to enter said seat and clutch the rotating sleeve 274 to the sleeve 276 to cause the same to rotate therewith. The arm 304 is situated between the cam member 278 and the crank wheel 279, a connecting piece 322 therebetween operating to permit but a limited rocking movement of the rod 301, as shown in Fig. 56. As long as the stop 305 is held in the position indicated in Fig. 56 after operation of the feed lever 319, the sleeves 274 and 276 will remain coupled together and rotate in unison. But since each revolution of the sleeve 276 effects a complete forward and backward feeding movement of the feeding devices, it will ordinarily be desirable to permit but one revolution, so that the operator, after pressing on the foot lever 321 sufficiently to trip the arm 304 and throw in the clutch 281, will immediately release said foot lever, whereupon the spring 313 will return the stop 305 and the parts for operating the same, so that when the arm 304 comes back to its first position after a complete revolution thereof, it will engage said stop and the clutch will be thrown into inoperative position and also the sleeve 276 positively held from further rotation. The clutch 271 operates exactly like the clutch 281, having an arm 323 which normally engages a stop 324 positioned in a stand 325 and held in operative position by a strong leaf-spring 326 as in the case of the similar parts of the clutch 281.

It is usually desirable to operate the clutch 271 to effect driving connection with the various devices for operating on the blanks after the feeding devices have operated to feed the blanks into their new positions and to withdraw the blanks from the machine, which will be just after the first half of the revolution of the sleeve 276 has been completed. It may also be desirable to set the clutch 271 so as to drive the operating devices without first providing a feeding action, as well as to operate the feeding devices without clutching in the operating devices as already considered. To effect these purposes the stop 324 is directly operated by a lower arm 327 of a two-armed lever pivoted at 328 to a bracket 329 bolted to the frame, the other arm 330 of said lever extending forwardly so as to come beneath the cam 278. The arm 330 is provided with a longitudinal slot 331. A cam slide 332 has thereon an extension 333 registering in said slide, said cam member being held in engagement with the arm 330 by a piece 334 bolted to the extension 333 so as to overlie the inner side of said arm 330. Pivotally attached to the cam member 332 at 335 is a link 336, which link pivotally connects said cam member to a depending link 337 pivoted at 315 to the stand 316 and having pivotally connected to the lower end thereof a link 338 pivoted at 339 to a hand-lever 340 pivoted at 341 to the floor or to an extension of the frame of the machine. The lever coöperates with a holding device 342 fastened to the front end of a receiving platform A, said holding device having three receiving notches 343, 344, 345, respectively, for holding said lever in any one of three operative positions. Normally the lever 340 will be kept in the central position, when the depending link 337 will also be centrally positioned and the cam slide 332 will occupy the position upon the arm 330 indicated in Fig. 47. Operation of the arm 327 to withdraw the stop 324 from beneath the clutch arm 323 is effected by depressing the arm 330. This is accomplished when the parts are normally positioned, the lever being in the central opening, by action of the cam 278 upon the cam slide 332, after the feeding device has been set in operation through the foot lever 321. It will be noted that the cam 278 is so positioned that the feeding sleeve 276 will have been rotated something more than one-half of its complete revolution when said cam 278 will contact with the cam slide 332, thereby depressing the arm 330 and rocking the two-armed lever so that the arm 327 thereof, connected at 358 to the stop 324, will operate to withdraw said stop from beneath the clutch arm 323, thereby clutching the sleeve 269 to the shaft 270 to effect the actuation of the operating devices. If it is desired to actuate the feeding device without actuating the operating devices the lever will be thrown to the forward position, when the cam slide 332 will occupy a position sufficiently removed from the cam 278 so that the same will pass by the cam slide 332 without contact therewith. On the other hand, if it is desired to actuate the operating device without actuating the feeding device, by throwing the lever 340 to its rearward position the cam face 346 of the cam member 332 will be thrust against the rounded end 347 of the cam 278, with the result that the cam slide 332 and the lever arm 330 will be depressed, thus removing the stop 324 from beneath the clutch arm 323.

Ordinarily it is desirable, in order to obtain the right speeding of the shafts 106 and to multiply the power transmitted thereto by the shaft 270, to make the ratio of the gears 282 and 283 such that it will take a plurality of revolutions of the shaft 270 to effect one revolution of the shafts 106. The spring 326 constantly actuates the stop 324 to place the same in position to receive the clutch arm 323 at each revolution thereof and effect unclutching of the shaft 270. It is necessary, therefore, to provide means positively to hold said stop in inoperative position while the complete revolution of the shaft 106 necessary properly to actuate all of the operating devices takes place. This I accomplish by means of a cam 349 encircling an enlargement 350 of the shaft 106 said cam extending a little over two-thirds of the way around the part 350 and being provided with a rounded backwardly extending end 351 to coöperate with an upper arm 352 of a two-armed lever pivoted at 353 to a bracket 354 on the casting 105.

As the shaft 106 rotates the cam face 351 engages the end 352 of the lever, thereby rocking the same inward and at the same time rocking outward the other end 355 of said lever, which end has a depending lug 356 held in operative engagement with the stop 324 by means of a piece 357 bolted to said stop, the lower end of said piece also forming means of effecting operative connection between the stop 324 and a similar lug 358 on the depending arm 327. It will thus be seen that as long as the arm 352 is in contact with the cam 349 the other arm 355 of said lever will positively hold the stop 324 away from the position to be engaged by the clutch arm 323, but when said arm 352 rides off of the cam 349 it will no longer serve to hold the stop 324, which will at once be returned to operative position by the spring 326.

In the operation of my complete machine, supposing a blank to be in each of the three operative positions of the machine, the operator standing at the front end thereof will place a blank upon the feeding platform A in contact with the positioning stops 25. The operator then presses down on the foot-lever 321, which releases the trip 304 and throws in the clutch 281, thereby rotating the crank 279 and the cam 278. The crank 279 oscillates the rocking member 280, which simultaneously oscillates the drums 49 for actuating the feeding devices and the drum 207 for actuating the blank removing devices, so that simultaneously the blank in the third operative position is removed from the machine, the blank in the second operative position transferred to the third operative position, the blank in the first operative position to the second operative position, and the blank on the feeding platform to the first operative position. When the positioning of the blanks as above indicated has been completed and just after the blank feeding and removing means have been started on their return reciprocation, the cam 278 will have reached the cam slide 332 (said slide being positioned by the lever 340 to occupy its normal or central position). By reason of the action of the cam 278 upon the cam slide 332 the lever arm 330 will be depressed, rocking the arm 327 backwardly on its pivot 328 to remove the stop 324 from beneath the clutch arm 323, thereby clutching-in the shaft 270 to rotate the shafts 106 on either side of the machine and actuate all of the devices for operating upon blanks. In the form of the invention shown it will take three revolutions of the shaft 270 to effect one complete revolution of the shafts 106, the cam 349 operating upon the lever 352 to hold the stop 324 out of position for engagement with the clutch arm 323 to permit the three revolutions. The operator will, however, have released the foot-lever 321 thereby permitting the stop 305 to return to operative position for receiving the clutch arm 304. When the same is brought around to proper position of a complete revolution of the sleeve 276, the stop 305 will engage said clutch arm unclutching and positively holding from rotation the sleeve 276, thus suspending the feeding and blank withdrawing operations until the foot-lever 321 is again actuated. By reason of the differential mounting of the eccentrics 109 on the shafts 106 the different members of the series of cutting devices, the longitudinal creasing devices on either side of the machine, and the different members of the series of transverse creasing devices will each be differentially operated with respect to the preceding devices so that no two of said operations in any one series, that is upon any one blank, will take place concurrently. Before the shafts 106 have completed their complete revolution the arm 352 will ride off of the cam 349 permitting the stop 324 to be returned to operative position to receive the clutch arm 323 and unclutch the shaft 270 and hold the same from rotation, and the parts will be in position for the operator to bring about a repetition of the same series of operations.

I claim—

1. In a machine for operating upon blanks, means for positively and intermittently feeding the blanks to successive positions in the machine, a series of members comprising cutting means for operating on the blanks in one position thereof, a second series of members comprising longitudinal creasing means for operating on the blanks in their next position, a third series of members comprising transverse creasing means for operating on the blanks in the third position thereof, all of said devices being arranged in pairs on opposite sides of the machine, a constantly rotating member on each side of the machine extending through and in actuating connection with each of said operating members, and means for adjusting said pairs of members relatively and transversely on the machine while maintaining said actuating connection with the rotating members.

2. In a machine for operating upon blanks, means for positively and intermittently feeding the blanks to successive positions in the machine, cutting means for operating on the blanks in one position thereof, longitudinal creasing means for operating on the blanks in their next position, transverse creasing means for operating on the blanks in a third position thereof, integral supporting members for all said operating and feeding means, and means to move said supporting members relatively and transversely of the machine whereby all said operating and feeding means will be simultaneously adjusted to operate upon blanks of different widths.

3. In a machine for operating upon blanks, means for positively and intermittently feeding the blanks to successive positions in the machine, cutting means for operating on the blanks in one position thereof, longitudinal creasing means for operating on the blanks in their next position, transverse creasing means for operating on the blanks in a third position thereof, two members extending longitudinally of the machine for supporting said operating and feeding means, and means to move one of said longitudinal members relatively to the other whereby the feeding and operating means will be adjusted to operate upon blanks of different widths.

4. In a machine for operating upon blanks, a frame comprising transverse flanged members, shoes provided with means for embracing said flanges and adapted to slide on said members, longitudinal supporting members secured to said shoes, independent operating members adjustably mounted on said supporting members, and means for connecting the longitudinal members so that one may be moved on said transverse member relatively to and in parallel relation with the other.

5. In a machine for operating upon blanks, longitudinal frame members forming guideways, independent operating members mounted on said guideways, means connecting each pair of said members at opposite sides of the machine for simultaneously adjusting said pairs of members along said guideways independently of all other pairs of operating members, and means on said guideways coöperating with all of said adjusting means to effect said independent adjustments.

6. In a machine for operating upon blanks, longitudinal frame members forming guideways, independent operating members movably mounted on said guideways, shafts connecting each pair of said members at opposite sides of the machine, racks on said guideways, gears on said shafts coöperating with said racks, a scale on one of said guideways, pointers on each of said pairs of operating members coöperating with the scale, and a removable hand crank adapted to operate each of said shafts to adjust the pairs of operating members along the guideways in accordance with the indications of the pointers on the scale to properly position the operating members relatively with respect to one another.

7. In a machine for operating upon blanks, a pair of longitudinal frame members forming guideways, means to adjust one of said guideways relatively to the other, independent operating members mounted on said guideways, means connecting opposite pairs of said guideways whereby each of said pairs of operating members may be adjusted along said guideways independently of all other pairs of operating members, said adjusting means being mounted in said operating members so as to permit movement of the operating members therealong when the guideways are adjusted relatively.

8. In a machine for operating upon blanks, longitudinal frame members forming guideways, independent operating members movably mounted on said guideways, shafts connecting each pair of said members at opposite sides of the machine, racks on said guideways, gears on said shafts coöperating with said racks, and a removable hand crank adapted to operate each of said shafts to adjust the pairs of operating members along the guideways.

9. In a machine for operating upon blanks, a pair of frame members forming guideways, independent operating members mounted on said guideways, means for simultaneously adjusting opposite pairs of said members along the guideways independently of all other pairs of said members, a shaft on each side of the machine mounted in all of the members on each guideway on said side of the machine for driving said operating members, said mounting being such as to permit the adjustment of said operating members on the guideways and along the shaft while maintaining driving connection between the shaft and the operating members.

10. In a machine for operating upon blanks, frame members forming guideways, a set of devices mounted on said guideways for performing a series of like operations upon and while the blanks are held in one position, means in said devices for effecting said operations, and a single member in driving connection with all of said means, the means in each device being connected with the driving member differentially with respect to the means in each preceding and succeeding device in the series, so that said devices are caused successively to operate upon the blanks.

11. In a machine for operating upon blanks, a pair of frame members forming guideways along the sides of the machine, devices for operating on the blanks mounted on both of said guideways, some of said devices on opposite sides of the machine being connected in pairs, each pair acting together in performing a single operation of a series of such operations, the remaining devices acting independently in performing an operation of another series, and means to cause each device of the series of independently acting devices and each pair of devices of the series of connected devices to operate on the blank successively throughout each of said series.

12. In a machine for operating upon blanks, frame members forming guideways along each side of the machine, devices for operating upon the blanks mounted on both of said guideways, some of said devices acting independently each to perform an operation of a series of like operations on both sides of the blank, other of said devices acting independently to perform a single operation on opposite sides of the blank, a third set of said devices being connected together in pairs across the machine, each pair acting to perform an operation of a series of like operations across the blanks, and means to cause each device of the series of independently acting devices on both sides of the machine, each device acting singly on each side of the machine, and each device of the series of connected devices for acting across the blanks, to perform their operations successively with respect to the action of each preceding device of each of said series of devices.

13. In a machine for operating upon blanks, a framework, a set of devices mounted on said framework for performing a series of like operations upon and while the blanks are held in one position, a shaft mounted in said framework and in the said devices, eccentrics on the shaft for actuating each of the operating devices, said eccentrics being differentially positioned with respect to one another, so that each of said devices is caused to operate on the blanks successively.

14. In a machine for operating upon blanks, a framework, a set of devices mounted on each side of said framework for performing a series of like operations upon and while the blanks are held in one position, and means for actuating said devices so that they will operate dissimultaneously on the blanks.

15. In combination with means to feed blanks to successive operative positions, a series of independent members for operating on the blanks in each of said successive positions, said members being positioned in pairs at opposite sides of the machine and comprising flat-topped base members over which the blanks are fed, and devices for guiding the edges of the blanks adjustably mounted on the said base members.

16. In combination with means to feed blanks to successive operative positions, a series of independent members for operating on the blanks in each of said successive positions, said members being positioned in pairs at opposite sides of the machine and having inwardly extending flat-topped base members over which the blanks are fed, edge-guiding devices mounted on said base members, and means for simultaneously adjusting all the edge-guiding devices on one side of the machine transversely of said base members.

17. In combination with means to feed blanks to successive operative positions, a series of independent members for operating on the blanks in each of said successive positions, said members being positioned in pairs at opposite sides of the machine and comprising inwardly extending flat-topped base members over which the blanks are fed, each of said base members being formed with a slotted way along the side thereof, an edge-guiding device positioned above the top of said base member and mounted to slide in said slotted way, and means for moving said device along said way to adjust the position thereof transversely of said base member.

18. In a machine for operating upon blanks, frame members forming guideways along both sides of the machine, a series of independent supporting members mounted on both said guideways and adjustable in oppositely positioned pairs along the same, transverse creasing devices carried by said supporting members, a device for guiding the edge of the blank mounted on all said transverse creasing members at one side of the machine and adjustable thereon toward and from the center of the machine, said mounting being adapted to permit independent adjustment of the supporting members on the guideways along said edge guiding member, independent edge guiding devices mounted on each of said supporting members at the other side of the machine, and means simultaneously to adjust said independent guiding devices to and from the center of the machine.

19. In a machine for operating upon blanks, longitudinal creasing members for operating on both sides of the blank, means on said creasing members and adjustable relatively thereto for guiding the edges of the blank, and spring members in one of said guiding means for holding the blank against the other member while permitting the same to narrow or crawl by reason of the creasing action.

20. In a machine for operating upon blanks, feeding means and means for performing a series of operations upon the blanks, a constantly driven member, means for actuating the feeding means and separate means for actuating the operating means, both of said means being normally inoperative, manually controlled means for connecting the constantly driven member with the actuating means for the feeding means, and means carried by said actuating means for the feeding means whereby the actuating means for the blank operating means is connected with the constantly driven member at a timed point near the end of the operation of the actuating means for the feeding means.

21. In a machine for operating upon blanks, devices for operating two sets of mechanisms, a power shaft and connections for independently driving said mechanisms, a separate clutch for connecting each of said mechanisms to the driving means, means under the control of the operator for operating each of said clutches, and means carried by the mechanism controlled by one of said clutches for operating the other clutch.

22. In a machine for operating upon blanks, feeding devices and devices for operating on the blanks, a power shaft, a member for actuating the feeding devices and a member for actuating the operating devices, a clutch on each of said actuating members for connecting the same with the power shaft, a foot-lever for operating the feeding clutch, and a cam carried by the first mentioned member for operating the clutch on the second mentioned member.

23. In a machine for operating upon blanks, feeding devices and devices for operating on the blanks, a power shaft, a member for actuating the feeding devices and a member for actuating the operating devices, a clutch on each of said actuating members for connecting the same with the power shaft, a foot-lever for operating the feeding clutch, a pivoted lever for operating the clutch on the second mentioned member having thereon a cam-member, and a cam carried by the first mentioned member for engagement with said cam-member to operate said clutch at each revolution of the first mentioned member.

24. In a machine for operating upon blanks, feeding devices and devices for operating on the blanks, a power shaft, a member for actuating the feeding devices and a member for actuating the operating devices, a clutch on each of said actuating members for connecting the same with the power shaft, a foot-lever for operating the feeding clutch, a pivoted lever for operating the clutch on the second mentioned member having thereon a cam-member, and a cam carried by the first mentioned member for engagement with said cam-member to operate said clutch at each revolution of the first mentioned member, said cam being so positioned as to engage the cam-member and operate the clutch on the second mentioned member when the first mentioned member for actuating the feeding means has completed a little more than a half revolution.

25. In a machine for operating upon blanks, feeding devices and devices for operating on the blanks, a power shaft, a member for actuating the feeding devices and a member for actuating the operating devices, a clutch on each of said actuating members for connecting the same with the power shaft, a foot-lever for operating the feeding clutch, a pivoted lever for operating the clutch on the second mentioned member having thereon a movable cam-member, and a cam carried by the first mentioned member for engagement with said cam-member to operate said clutch at each revolution of the first mentioned member, means under the control of the operator to shift the cam-member on the lever either to cause it to engage the cam and thus operate the clutch on the second mentioned member independently of the feed-actuating devices or to withdraw said cam-member from position to be engaged by said cam and permit actuation of the feeding means without actuation of the blank-operating means.

26. In a machine for operating upon blanks, feeding devices and devices for operating on the blanks, a power shaft, a member for actuating the feeding devices and a member for actuating the operating devices, a clutch on each of said actuating members for connecting the same with the power shaft, means under the control of the operator for operating either clutch independently to actuate either the feeding means or the blank-operating means independently, and means carried by the first mentioned member, whereby the rotation of said first mentioned member in actuating the feeding means will operate the clutch on the second mentioned member to actuate the blank-operating devices.

27. In a machine for operating upon blanks, a power shaft, a feeding device, a sleeve connected to the feeding device and effecting complete operation thereof at each complete revolution, a clutch for connecting said sleeve to the power shaft, an arm on the clutch, a stand, a stop rod spring held in said stand, means holding the stop rod normally beneath and in engagement with the clutch arm to hold said clutch inoperative, and means under the control of the operator for withdrawing the stop to permit the clutch to become operative, said stop upon being released from the controlling means returning to position for engagement with the clutch arm to render the clutch inoperative and positively hold the sleeve when the same has completed a full revolution.

28. In a machine for operating upon blanks, a power shaft, a series of independent members for operating on the blanks, a shaft for directly actuating all of said operating members geared to the power shaft so that it requires a plurality of revolutions of the power shaft to effect one revolution of the operating shaft, a clutch for connecting the operating shaft to the power shaft having an arm, a stop rod normally positioned to engage the clutch arm and hold the clutch inoperative, means for automatically withdrawing the stop to permit the clutch to become operative, a cam on the operating shaft, and means engaging said stop rod and coöperating with said cam when said shaft is revolving for holding said stop rod in inoperative position until the operating shaft has completed one revolution.

29. In a machine for operating upon blanks, means for cutting sections from the edges of the blanks comprising reciprocating members carrying adjustable knives, a stationary form, cutting plates carried on said form and coöperating with said reciprocating knives to cut out said sections, means for adjusting said plates to compensate for wear on the edges thereof, plate springs for retracting said reciprocating members, and a finger on said springs entering between and coöperating with said plates to keep the same properly spaced.

30. In a machine for operating upon blanks, a pair of longitudinal frame members forming guideways, means to adjust one of said guideways relatively to the other, oppositely positioned supports mounted on said guideways, and upper and lower transverse creasing bars mounted in each pair of opposite supports, said creasing bars being directly secured to the supports at one side of the machine and slidably mounted in the supports at the opposite side of the machine to permit adjustment of all of said supports when said guideways are adjusted relatively.

31. In a machine for operating upon blanks, a pair of longitudinal frame members forming guideways, means to adjust one of said guideways relatively to the other, oppositely positioned supports mounted on said guideways, and upper and lower transverse creasing bars mounted in each pair of opposite supports, said creasing bars being directly secured to the supports at one side of the machine and slidably mounted in the supports at the opposite side of the machine to permit adjustment of all of said supports when said guideways are adjusted relatively, a shaft extending through all of the supports on the immovable guideway and having fixed actuating connection with the upper creasing bar, and a shaft extending through all of the supports on the movable guideway and having sliding actuating connection with the upper creasing bar.

32. In a machine for operating upon blanks, a pair of longitudinal frame members forming guideways, means to adjust one of said guideways relatively to the other, oppositely positioned supports mounted on said guideways, upper and lower transverse creasing bars mounted in each pair of opposite supports, said creasing bars being directly secured to the supports at one side of the machine and slidably mounted in the supports at the opposite side of the machine to permit adjustment of all of said supports when said guideways are adjusted relatively, a shaft extending through all of the supports on the immovable guideway and having fixed actuating connection with the upper creasing bars, a shaft extending through all of the supports on the movable guideway and having sliding actuating connection with the upper creasing bars, and means for moving the opposite pairs of supports and the creasing members carried thereby simultaneously along said guideways and said shafts while maintaining actuating connection with the creasing members.

33. In a machine for operating upon blanks, a pair of longitudinal frame members forming guideways, means to adjust said guideways relatively to vary the distance between the same, pairs of supporting members on said guideways, fixed and movable transverse creasing bars carried by each opposite pair of said supporting members, shafts extending through all said supporting members on each side of the machine, eccentrics on each shaft connected with the movable creasing bar for operating the same, and means for lengthening or shortening said connections to adjust the movable creasing bar so as to insure accurate engagement thereof with the fixed creasing bar.

34. In a machine for operating upon blanks, a pair of frame members forming guideways, means for varying the distance between said guideways, a series of supporting members arranged in oppositely disposed pairs on each of said guideways, relatively fixed and movable transverse creasing bars mounted in each pair of said supporting members, means adjustable laterally and vertically for holding the fixed creasing bars slidably mounted in the movable supports, means for adjusting the movable creasing bars vertically, springs normally to hold said bars apart, and means for actuating said bars in opposition to said springs to cause the same to crease the blanks.

35. In a machine for operating upon blanks, means for positively and intermittently feeding the blanks to successive positions in the machine, cutting members for operating on the blanks in one position thereof, longitudinal creasing members for operating upon the blanks in the next position, transverse creasing means for operating on the blanks in a third position thereof, positive means to move the members relatively to adjust them for operating on blanks of different widths, and positive means to move the members relatively to adjust them for operating on blanks of different lengths.

36. In a machine of the described class, the combination of a supporting frame, a set of cutting blades, two sets of crimping bars, tracks for supporting sheets of straw board as they are conveyed to said cutting blades and bars, means for communicating a reciprocating movement to said blades and bars, a rocking lever, means for communicating a rocking movement to said lever, a gear segment connected with the respective ends of said lever, a pair of pinions respectively supported in mesh with said gear segments, shafts for supporting said pinions, a grooved pulley supported from each of said shafts, a flexible cable centrally supported from each of said pulleys, each cable being connected at its respective ends with a reciprocating member, sheet conveyers connected with each of said reciprocating members, the conveyers connected with one set of reciprocating members being adapted with each oscillatory movement of said rocking lever to convey sheets of board to said cutting blades and crimping bars, and the conveyers connected with the other set of reciprocating members being adapted to simultaneously remove the finished sheets from the machine.

37. In a machine of the described class, the combination of a supporting frame, a toothed bar supported longitudinally from said frame, a plurality of sets of brackets, each set comprising two brackets movably supported from said frame, a set of cutting blades carried by one set of said brackets, a plurality of crimping bars carried by the other set of brackets, pinions, and pinion supporting shafts revolubly supported from said brackets, the teeth of said pinions being in mesh with the teeth of said longitudinal bar, and means for revolving said pinions and pinion supporting shafts in opposite directions, whereby said brackets and the cutting blades and crimping bars carried by said brackets, are adjusted longitudinally of the supporting frame, nearer to or farther from each other, substantially as specified.

38. In a machine of the described class, the combination of a supporting frame, a plurality of sets, comprising two each, of brackets, supported from and adapted to be longitudinally adjusted upon said frame, the rear opposing bracket of each set being transversely adjustable nearer to or farther from the front bracket, a rod revolubly connected with the front bracket of each set and having screw threaded bearings in the connecting members of the rear brackets of each set, and means for manually revolving said rods in opposite directions, whereby the rear brackets of each set are adapted to be adjusted nearer to or farther from the front brackets, and whereby the cutting blades and crimping bars carried by said brackets, are adjusted to correspond with the widths of the sheets to be operated upon.

JOHN E. ERICKSON.

Witnesses:
F. A. WHITELEY,
H. A. BOWMAN.